(12) United States Patent
Kim

(10) Patent No.: US 12,526,077 B2
(45) Date of Patent: Jan. 13, 2026

(54) METHOD FOR CAUSING SMF TO EFFECTIVELY PERFORM REDUNDANT TRANSMISSION BY IMPROVING FUNCTION OF NWDAF

(71) Applicant: LG ELECTRONICS INC., Seoul (KR)

(72) Inventor: Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 365 days.

(21) Appl. No.: 18/007,687

(22) PCT Filed: Oct. 6, 2020

(86) PCT No.: PCT/KR2020/013563
§ 371 (c)(1),
(2) Date: Dec. 1, 2022

(87) PCT Pub. No.: WO2021/251559
PCT Pub. Date: Dec. 16, 2021

(65) Prior Publication Data
US 2023/0318746 A1    Oct. 5, 2023

(30) Foreign Application Priority Data

Jun. 12, 2020 (KR) .................. 10-2020-0071387
Aug. 12, 2020 (KR) .................. 10-2020-0101241

(51) Int. Cl.
*H04J 3/14* (2006.01)
*H04L 1/08* (2006.01)
*H04W 28/02* (2009.01)

(52) U.S. Cl.
CPC .......... *H04L 1/08* (2013.01); *H04W 28/0268* (2013.01)

(58) Field of Classification Search
USPC ....................................................... 370/235
See application file for complete search history.

(56) References Cited

U.S. PATENT DOCUMENTS

2019/0222489 A1    7/2019  Shan
2019/0253917 A1    8/2019  Dao
(Continued)

FOREIGN PATENT DOCUMENTS

CN       109996303 A     7/2019
JP       2021520745 A    8/2021
(Continued)

OTHER PUBLICATIONS

"3rd Generation Partnership Project; Technical Specification Group Services and System Aspects; Architecture enhancements for 5G System (5GS) to support network data analytics services (Release 16)"; 3GPP TS23.288 V16.3.0 (Mar. 2020), pp. 1-62.
(Continued)

*Primary Examiner* — Chuong T Ho
(74) *Attorney, Agent, or Firm* — BRYAN CAVE LEIGHTON PAISNER LLP

(57) ABSTRACT

One disclosure of the present specification may provide an operation method of a session management function (SMF) node for managing a protocol data unit (PDU) session. The method may comprise a step of acquiring analysis information from a network data analytics function (NWDAF) node. The acquired analysis information may include experience analysis information for redundant transmission. The method may comprise a step of determining, on the basis of the analysis information, the PDU session to be redundantly transmitted through two tunnels during a procedure related to the PDU session.

12 Claims, 32 Drawing Sheets

(56) References Cited

U.S. PATENT DOCUMENTS

| | | | |
|---|---|---|---|
| 2020/0112907 A1* | 4/2020 | Dao | H04M 15/8016 |
| 2021/0105196 A1* | 4/2021 | Dao | H04L 43/026 |
| 2021/0274385 A1* | 9/2021 | Zhang | H04W 28/0284 |
| 2022/0060942 A1* | 2/2022 | Jeon | H04L 43/0852 |
| 2022/0104118 A1* | 3/2022 | Ding | H04W 8/06 |
| 2022/0104296 A1* | 3/2022 | Mary | H04L 1/08 |
| 2022/0174482 A1* | 6/2022 | Wifvesson | H04W 76/15 |
| 2022/0337474 A1* | 10/2022 | Consoli | H04L 41/0894 |
| 2024/0236730 A1* | 7/2024 | Kim | H04W 24/10 |

FOREIGN PATENT DOCUMENTS

| | | | |
|---|---|---|---|
| WO | 2019/032968 A1 | 2/2019 | |
| WO | 2019/119435 A1 | 6/2019 | |
| WO | 2019/222905 A1 | 11/2019 | |

OTHER PUBLICATIONS

"Update of QoS monitoring for URLLC based on RAN3 decision", Intel, SA WG2 Meeting #S2-138E, Apr. 20-24, 2020, E-meeting, S2-2002680, Apr. 7, 2020, 4 pages.

"Draft CR: 5G URLLC Handling redundant PDU Sessions", Nokia, Nokia Shanghai Bell, SA WG2 Meeting #138E, Elbonia, Apr. 20-23, 2020, S2-2003178, Feb. 13, 2020, pp. 1-5.

3GPP TS 23.501 V16.4.0, "3rd Generation Partnership Project; Technical Specification Group Services and System Aspects; System architecture for the 5G System (5Gs); Stage 2 (Release 16)", Mar. 2020.

3GPP TS 23.502 V16.4.0, "3rd Generation Partnership Project; Technical Specification Group Services and System Aspects; Procedures for the 5G System (5GS); Stage 2 (Release 16)". Mar. 2020.

Nokia "Corrections for SMF, UPF and PCF selection for an MA PDU session," SA WG2 Meeting #132, S2-1903320, 6 pages, Apr. 2018.

* cited by examiner

- PRIOR ART -

- PRIOR ART -

- PRIOR ART -

- PRIOR ART -

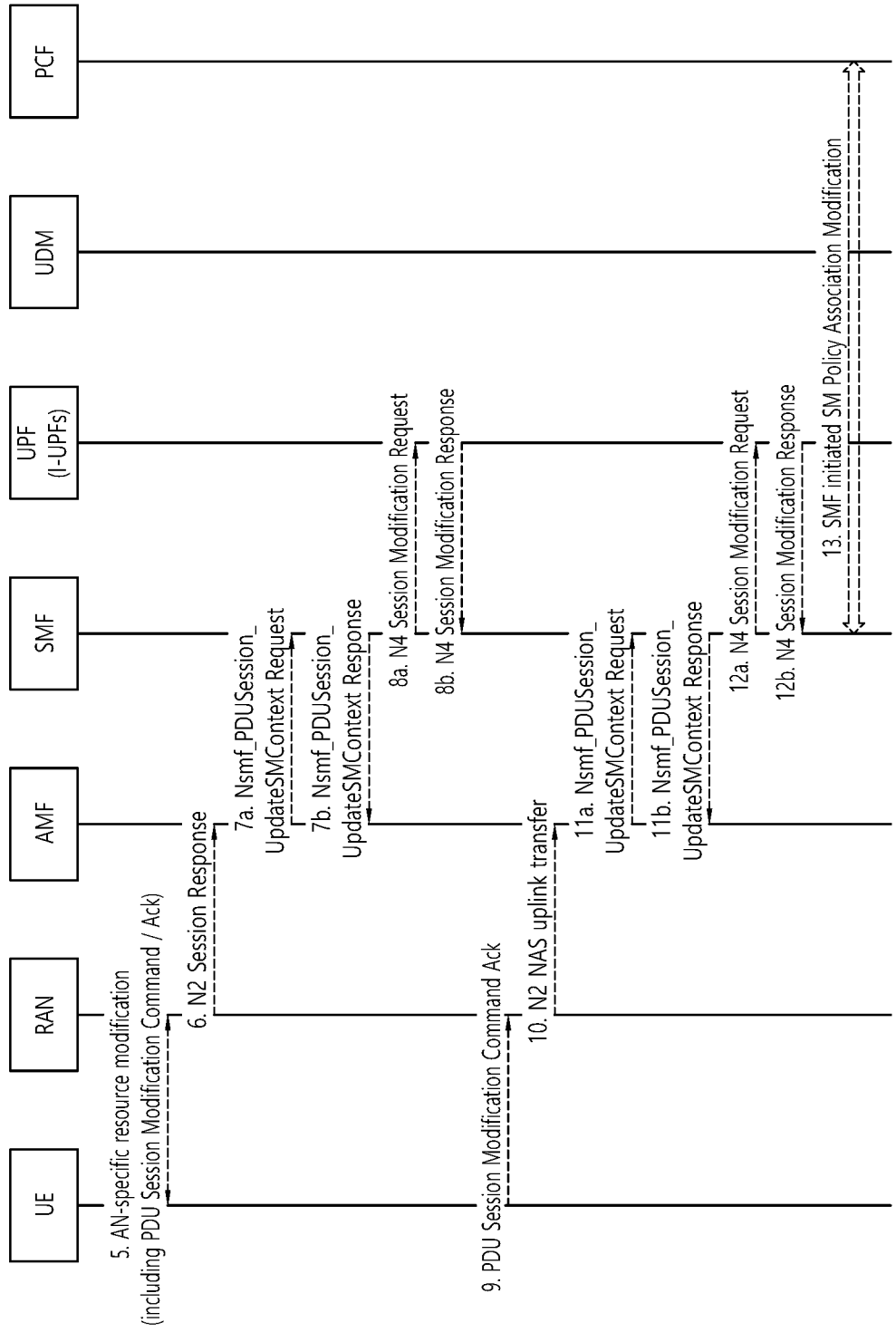

METHOD FOR CAUSING SMF TO EFFECTIVELY PERFORM REDUNDANT TRANSMISSION BY IMPROVING FUNCTION OF NWDAF

CROSS-REFERENCE TO RELATED APPLICATIONS

This application is the National Stage filing under 35 U.S.C. 371 of International Application No. PCT/KR2020/013563, filed on Oct. 6, 2020, which claims the benefit of and priority to Korean Application No. 10-2020-0071387, filed on Jun. 12, 2020 and Korean Application No. 10-2020-0101241, filed on Aug. 12, 2020, the contents of which are all hereby incorporated by reference herein in their entirety.

TECHNICAL FIELD

The present specification relates to mobile communications.

BACKGROUND

FIG. 1 shows a structure of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (Evolved Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM)/Enhanced Data rates for Global Evolution (EDGE) Radio Access Network (GERAN)).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an untrusted network, such as an Interworking Wireless Local Area Network (I-WLAN), a trusted network, such as a Code Division Multiple Access (CDMA)).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a UE to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |

TABLE 1-continued

| REFERENCE POINT | DESCRIPTION |
|---|---|
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point that provides related control and mobility support between trusted non-3GPP access and PDN GWs to the user plane. S2b is a reference point that provides related control and mobility support between ePDG and P-GW to the user plane.

Next-Generation Mobile Communication Network

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020".

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 3 below. That is, FR1 may include a frequency band of above 6 GHZ (or, 5850, 5900, 5925 MHz, etc.). For example, a frequency band of above 6 GHz (or, 5850, 5900, 5925 MHZ, etc.) included in FR1 may include an unlicensed band. The unlicensed band may be used for various purposes, e.g., for communication for a vehicle (e.g., autonomous driving).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 2 is a structural diagram of a next-generation mobile communication network.

The 5G Core network (5GC) may include various components, part of which are shown in FIG. 2, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

A UE 10 is connected to a data network via the UPF 44 through a Next Generation Radio Access Network (NG-RAN), i.e., gNB or base station.

The UE 10 may be provided with a data service even through untrusted non-3GPP access, e.g., a Wireless Local Area Network (WLAN). In order to connect the non-3GPP access to a core network, the N3IWF 59 may be deployed.

FIG. 3 is an exemplary diagram illustrating a predicted structure of a next generation mobile communication in terms of a node.

Referring to FIG. 3, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 3, a UE can simultaneously access two data networks using multiple Protocol Data Unit (PDU) sessions.

FIG. 4 is an exemplary diagram illustrating an architecture for supporting simultaneously access two data networks.

FIG. 4 illustrates an architecture that allows the UE to simultaneously access two data networks using one PDU session.

Reference points shown in FIGS. 3 and 4 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 5 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

NAS layer is divided into a NAS entity for Mobility Management (MM) and a NAS entity for Session Management (SM).

1) NAS entity for MM provides the following functions in general.
NAS procedures related to AMF include the following.
Registration management and access management procedures. AMF supports the following functions.
Secure NAS signal connection between UE and AMF (integrity protection, encryption)
2) The NAS entity for SM performs session management between the UE and the SMF.
The SM signaling message is processed, that is, generated and processed, at an NAS-SM layer of the UE and SMF. The contents of the SM signaling message are not interpreted by the AMF.
In the case of SM signaling transmission,
The NAS entity for the MM creates a NAS-MM message that derives how and where to deliver an SM signaling message through a security header representing the NAS transmission of SM signaling and additional information on a received NAS-MM.
Upon receiving SM signaling, the NAS entity for the SM performs an integrity check of the NAS-MM message, analyzes additional information, and derives a method and place to derive the SM signaling message.

Meanwhile, in FIG. 5, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

In the next-generation (i.e., fifth-generation) mobile communication, it is considered to provide local services (or specialized services for each geographic area). In the next-generation mobile communication, such a local service is being referred to as LADN.

Meanwhile, among network nodes, a Network Data Analytics Function (NWDAF) may collect UE mobility-related information and generate UE mobility statistics or predictions through data analysis.

In addition, redundant transmission is being discussed for URLCC in next-generation (i.e., fifth generation) mobile communication.

However, for redundant transmission, research on functional extension of NWDAF is required, but there is a difficulty that has not been actively progressed yet.

SUMMARY

Accordingly, an object of the present specification is to propose a method for solving the above-described problems.

In order to solve the above-described problems, a disclosure of the present specification may provide a method for operating a Session Management Function (SMF) node that manages a Protocol Data Unit (PDU) session. The method may include obtaining analytics information from a Network Data Analytics Function (NWDAF) node. The obtained analytics information may include experience analytics information about redundant transmission. The method may include, based on the analytics information, determining that the PDU session is redundantly transmitted through two tunnels during a procedure related to the PDU session.

In order to solve the above-described problems, a disclosure of the present specification may provide a chipset mounted on a Session Management Function (SMF) node. The chipset may include at least one processor; and at least one memory for storing instructions and operably electrically connectable to the at least one processor. The instructions, based on being executed by the at least one processor, may perform operations comprising: obtaining analytics information from a Network Data Analytics Function (NWDAF) node. The obtained analytics information includes experience analytics information about redundant transmission. The operations may include, based on the analytics information, determining that the PDU session is redundantly transmitted through two tunnels during a procedure related to the PDU session.

In order to solve the above-described problems, a disclosure of the present specification may provide a device for a Session Management Function (SMF) node. The device may include a transceiver; at least one processor; and at least one memory for storing instructions and operably electrically connectable to the at least one processor. The instructions, based on being executed by the at least one processor, may perform operations comprising: obtaining analytics information from a Network Data Analytics Function (NWDAF) node. The obtained analytics information may include experience analytics information about redundant transmission. The operations may include, based on the analytics information, determining that the PDU session is redundantly transmitted through two tunnels during a procedure related to the PDU session.

In order to solve the above-described problems, a disclosure of the present specification may provide a non-volatile computer-readable storage medium having recorded thereon instructions. The instructions, when executed by one or more processors mounted on a Session Management Function (SMF) node, may cause the one or more processors to perform operations. The operation may include obtaining analytics information from a Network Data Analytics Function (NWDAF) node. The obtained analytics information may include experience analytics information about redundant transmission. The operations may include, based on the analytics information, determining that the PDU session is redundantly transmitted through two tunnels during a procedure related to the PDU session.

According to the disclosure of the present specification, it is possible to solve the problems of the prior art.

BRIEF DESCRIPTION OF THE DRAWINGS

FIGS. 9a and 9b show a modification procedure for a PDU session.

DETAILED DESCRIPTION

Figure 1:
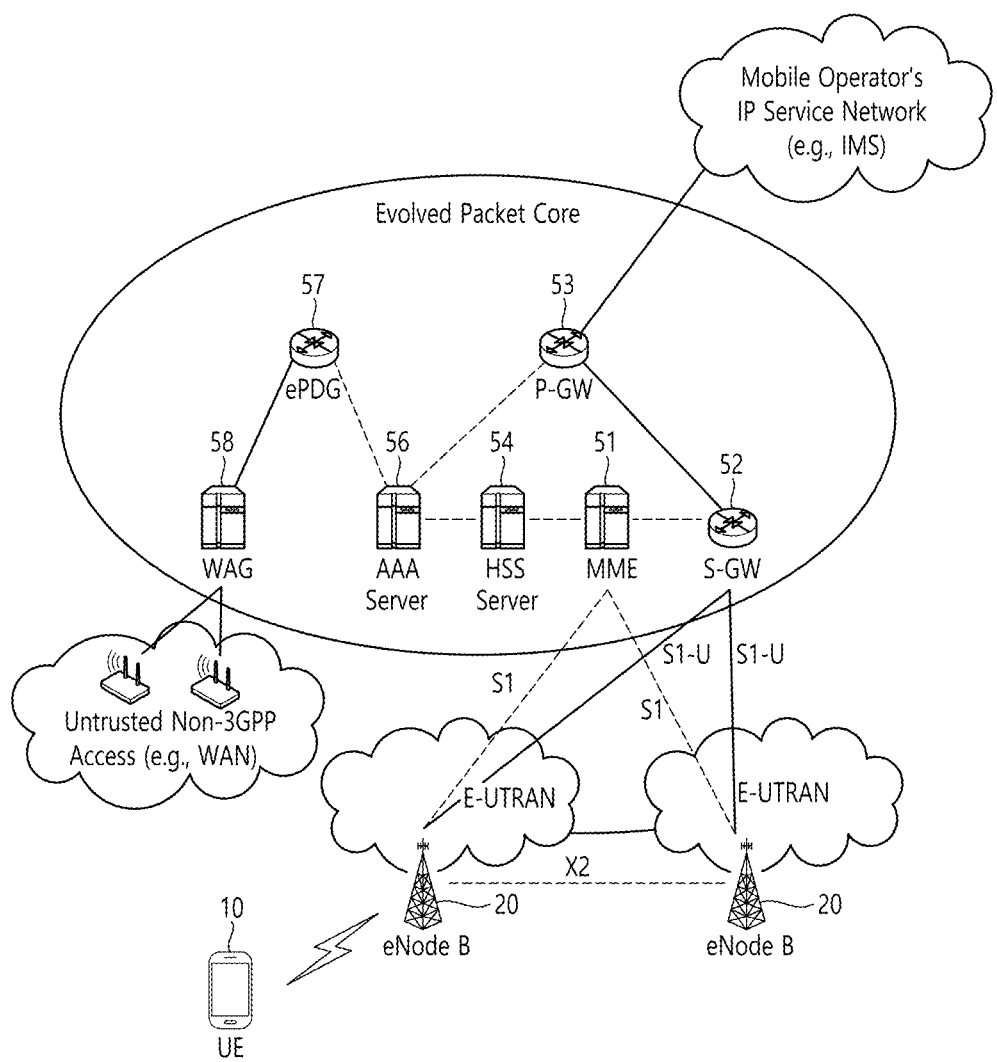
FIG. 1 shows a structure of an evolved mobile communication network.
Figure 2:
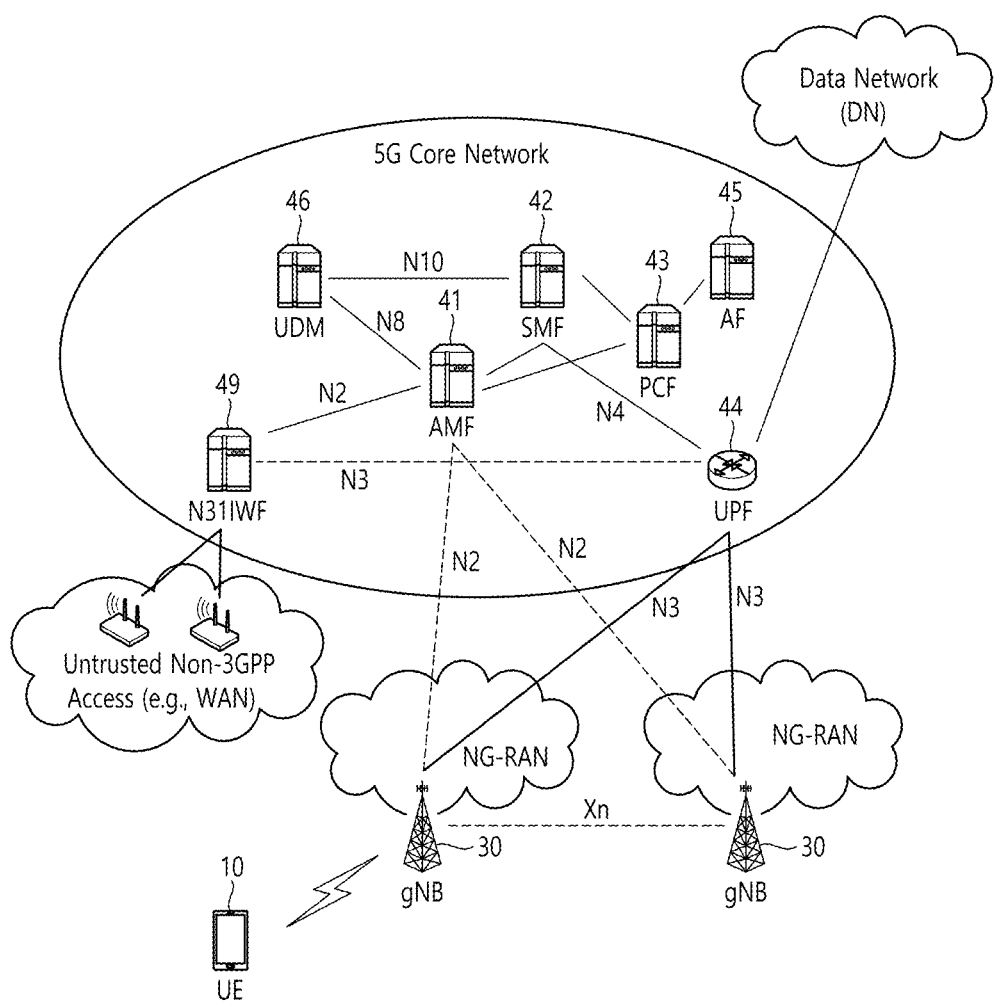
FIG. 2 is a structural diagram of a next-generation mobile communication network.
Figure 3:
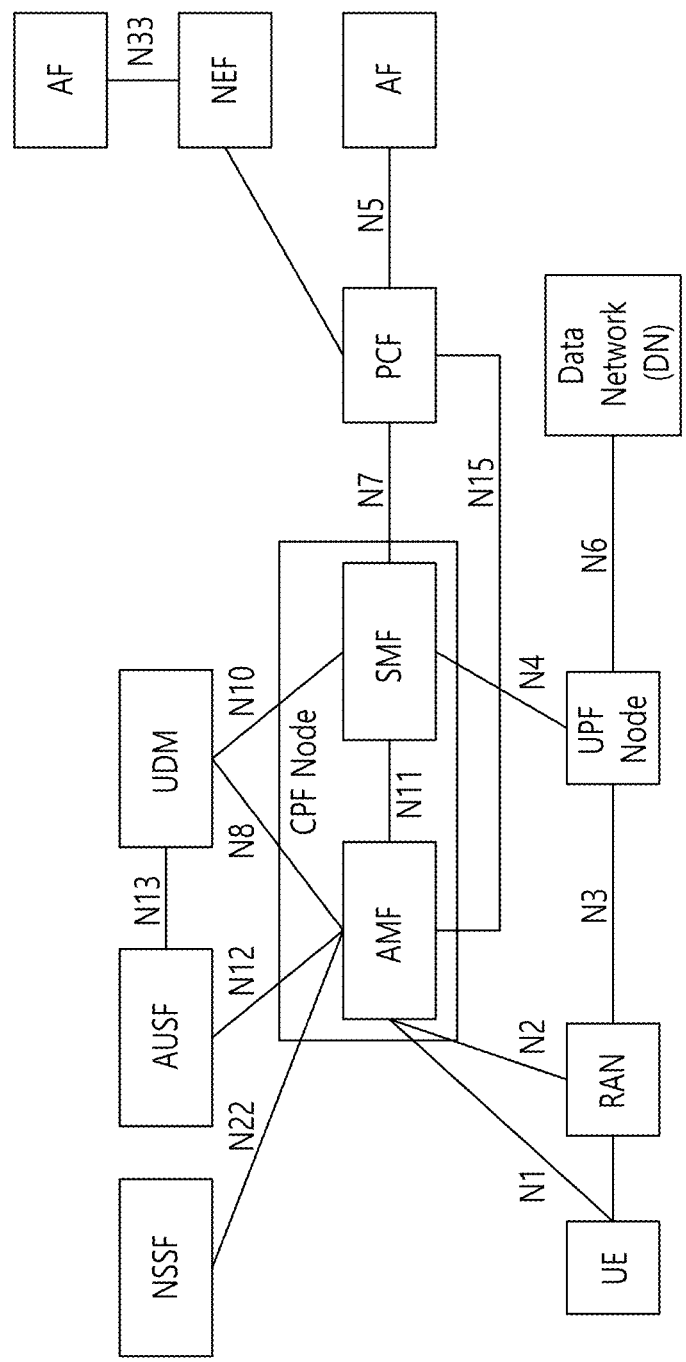
FIG. 3 is an exemplary diagram illustrating a predicted structure of a next generation mobile communication in terms of a node.
Figure 4:
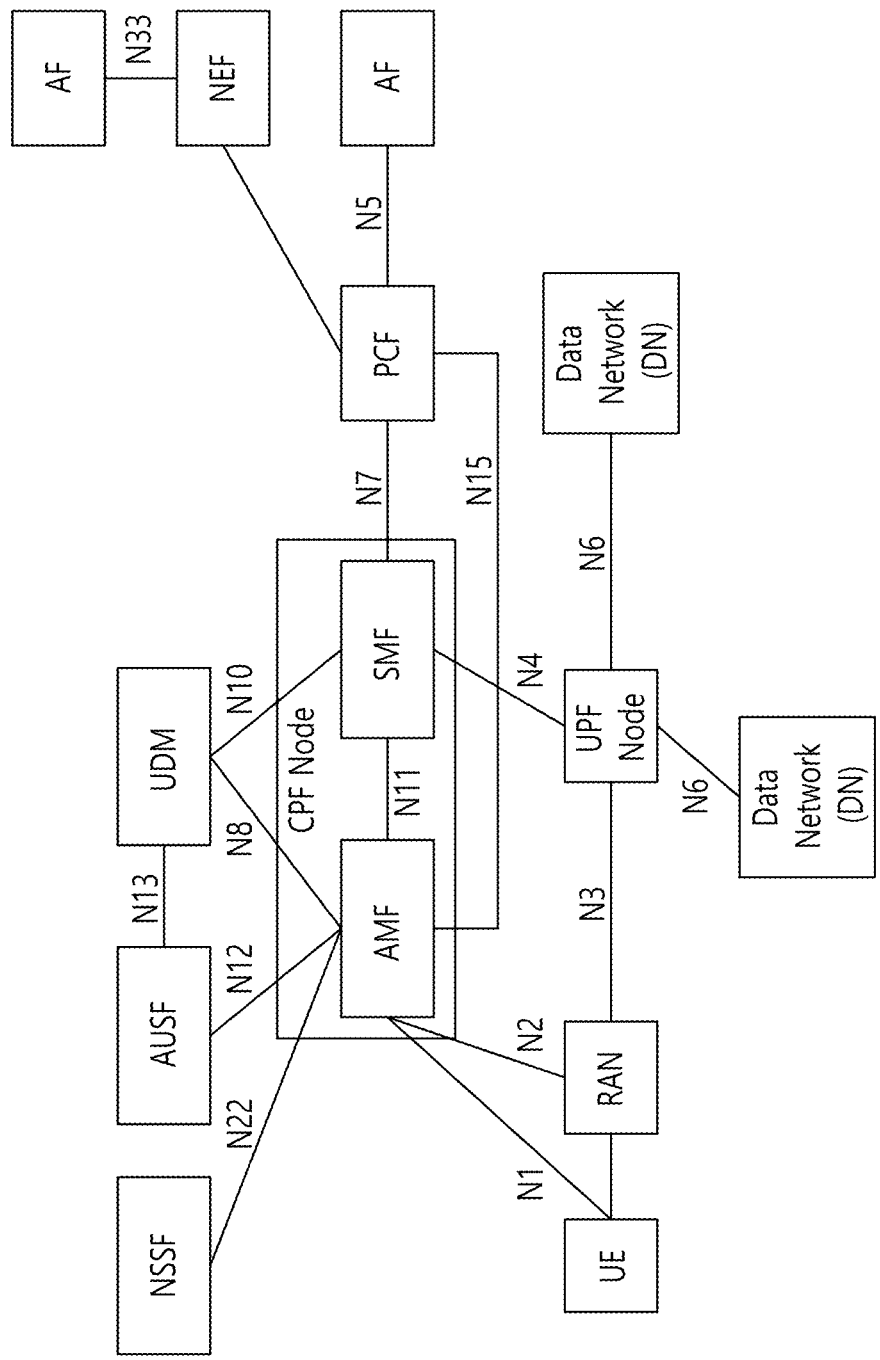
FIG. 4 is an exemplary diagram illustrating an architecture for supporting simultaneously access two data networks.
Figure 5:
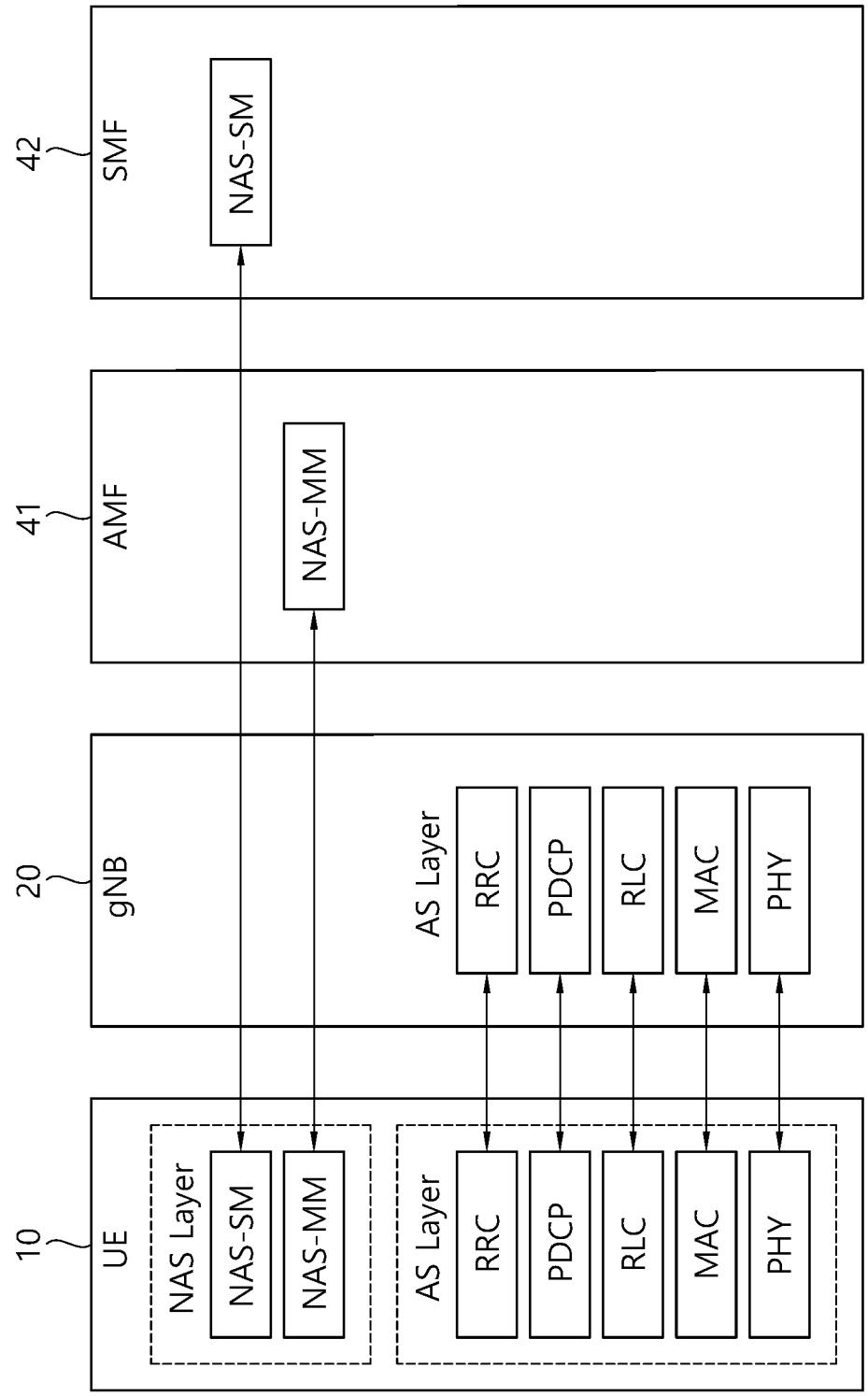
FIG. 5 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

Network Slice

Hereinafter, network slicing to be introduced in next-generation mobile communication will be described.

Next-generation mobile communication introduces the concept of network slicing in order to provide various services through one network. Here, the network slicing is a combination of network nodes having functions necessary when providing a specific service. A network node constituting a slice instance may be a hardware independent node or a logically independent node.

Each slice instance may be composed of a combination of all nodes necessary to configure the entire network. In this case, one slice instance may provide a service to the UE alone.

Alternatively, the slice instance may be composed of a combination of some nodes among nodes constituting the network. In this case, the slice instance may not provide a service to the UE alone, but may provide a service to the UE in association with other existing network nodes. In addition, a plurality of slice instances may provide a service to the UE in association with each other.

A slice instance is different from a dedicated core network in that the entire network node including the core network (CN) node and the RAN can be separated. In addition, a slice instance is different from a dedicated core network in that network nodes can simply be logically separated.

Figure 6A:
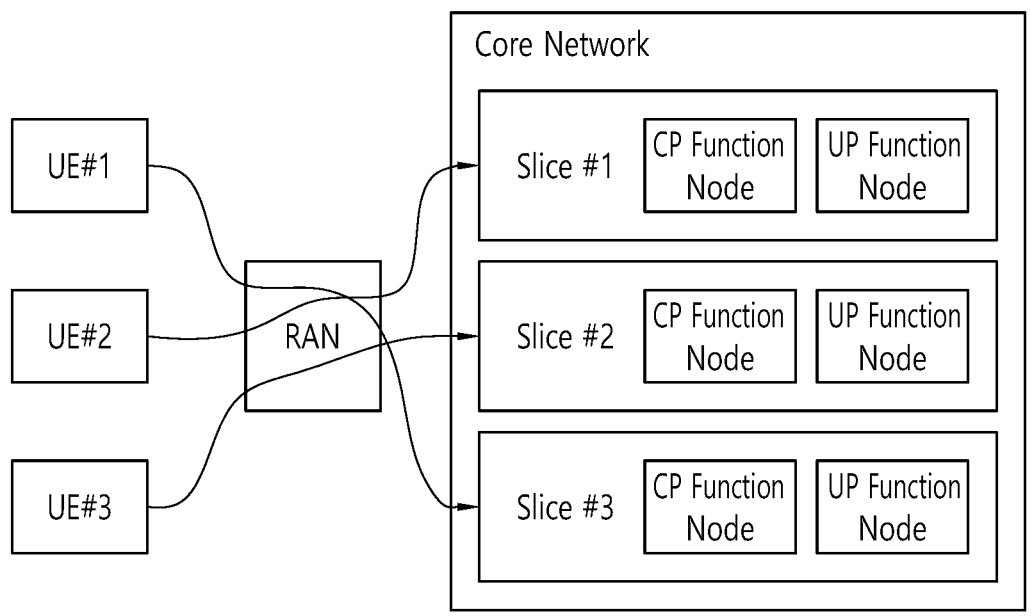
FIG. 6a is an exemplary diagram illustrating an example of an architecture for implementing the concept of network slicing.

FIG. 6*a* is an exemplary diagram illustrating an example of an architecture for implementing the concept of network slicing.

As can be seen with reference to FIG. 6*a*, the core network (CN) may be divided into several slice instances. Each slice instance may include one or more of a CP function node and a UP function node.

Each UE may use a network slice instance suitable for its own service through the RAN.

Contrary to that shown in FIG. 6*a*, each slice instance may share one or more of a CP function node and a UP function node with another slice instance. This will be described with reference to FIG. 6*b* as follows.

Figure 6B:
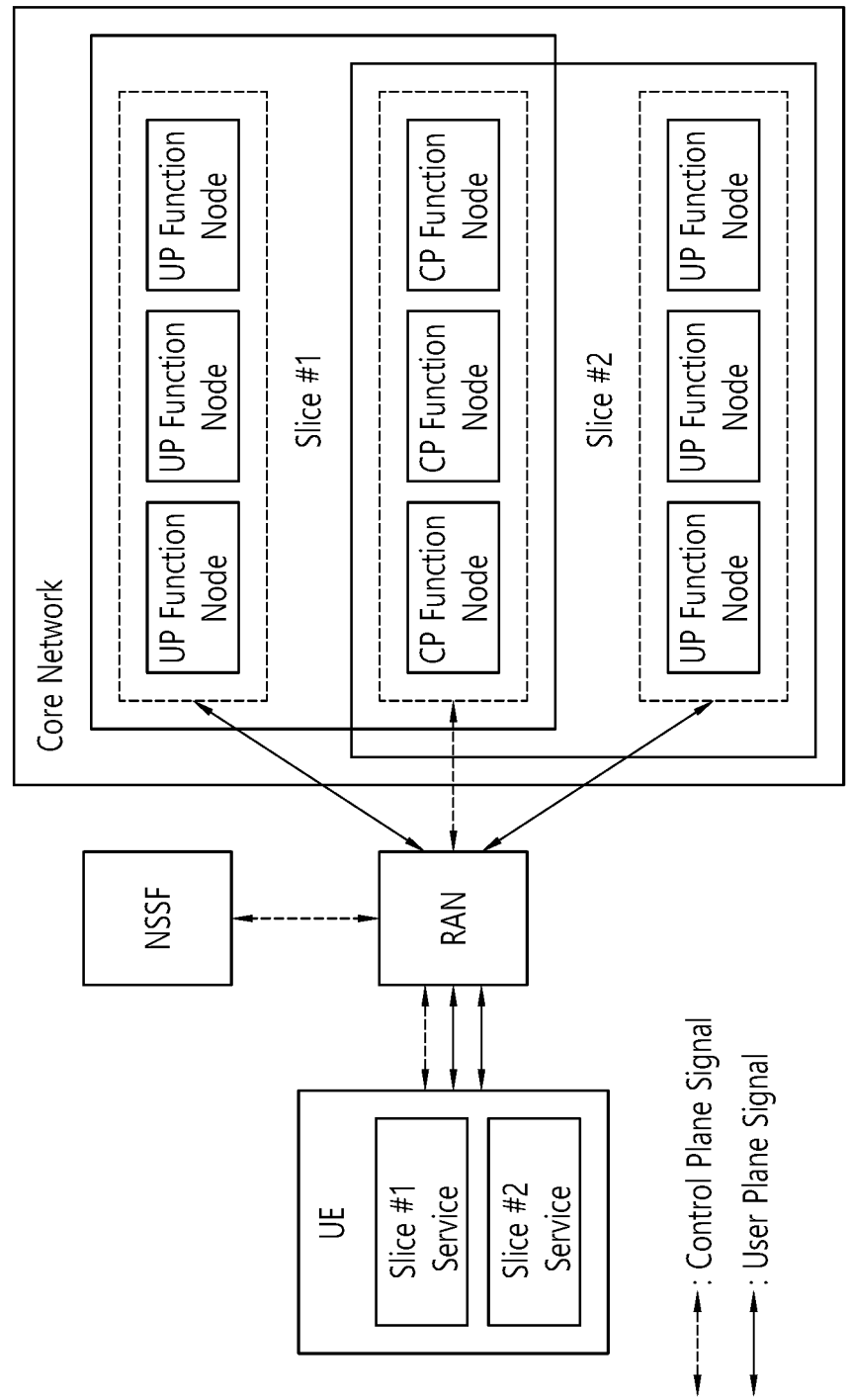
FIG. 6b is an exemplary diagram illustrating another example of an architecture for implementing the concept of network slicing.

FIG. 6*b* is an exemplary diagram illustrating another example of an architecture for implementing the concept of network slicing.

Referring to FIG. 6*b*, a plurality of UP functional nodes is clustered, and similarly, a plurality of CP functional nodes is also clustered.

And, referring to FIG. 6b, slice instance #1 (or referred to as instance #1) in the core network includes a first cluster of UP functional nodes. And, the slice instance #1 shares a cluster of CP functional nodes with slice instance #2 (or called instance #2). The slice instance #2 includes a second cluster of UP functional nodes.

The illustrated NSSF selects a slice (or instance) that can accommodate the service of the UE.

The illustrated UE may use service #1 through the slice instance #1 selected by the NSSF, and may use service #2 through the slice instance #2 selected by the NSSF.

Registration Procedure

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new Tracking Area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 7A:
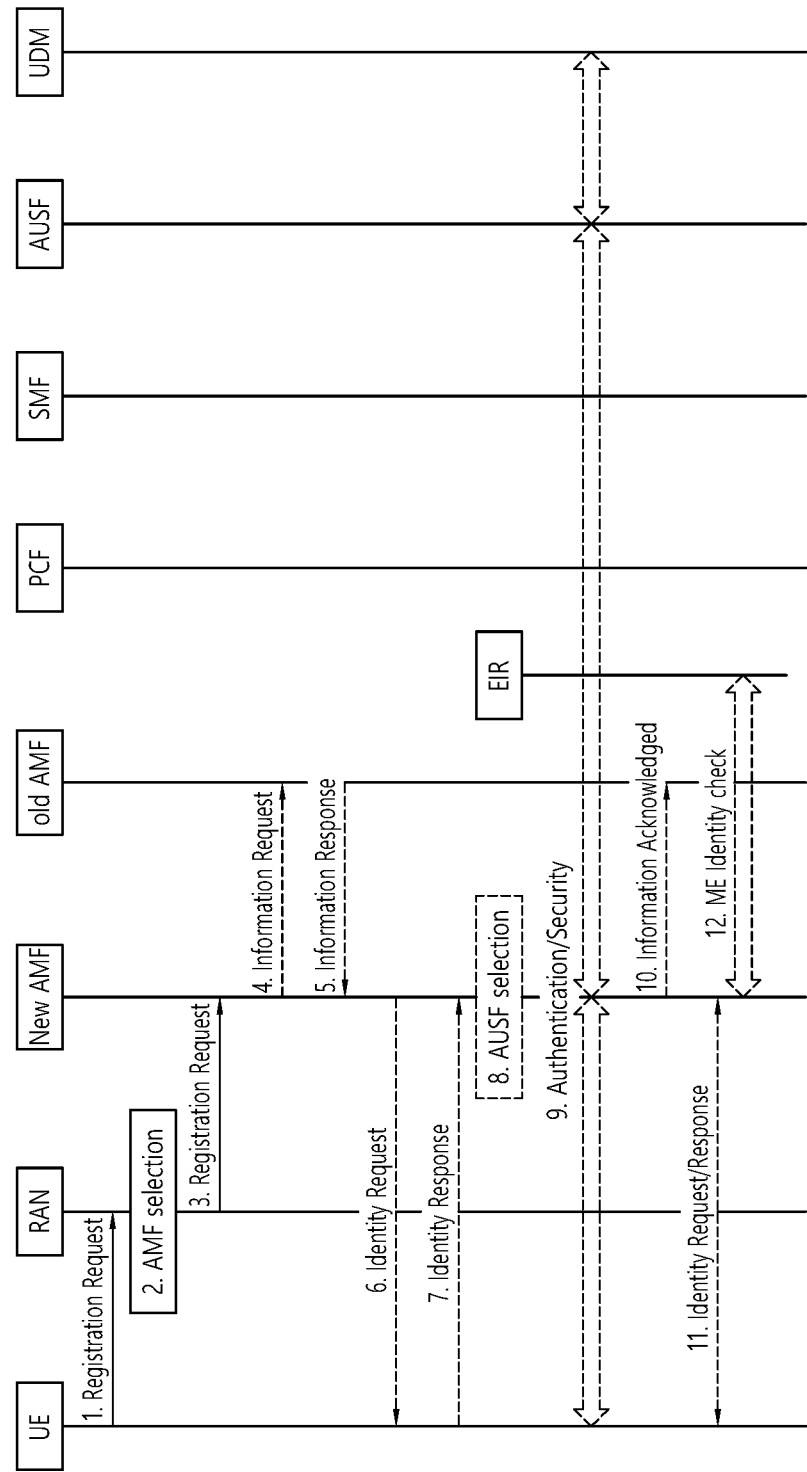
FIGS. 7a and 7b are a signal flowchart illustrating an exemplary registration procedure.
Figure 7B:
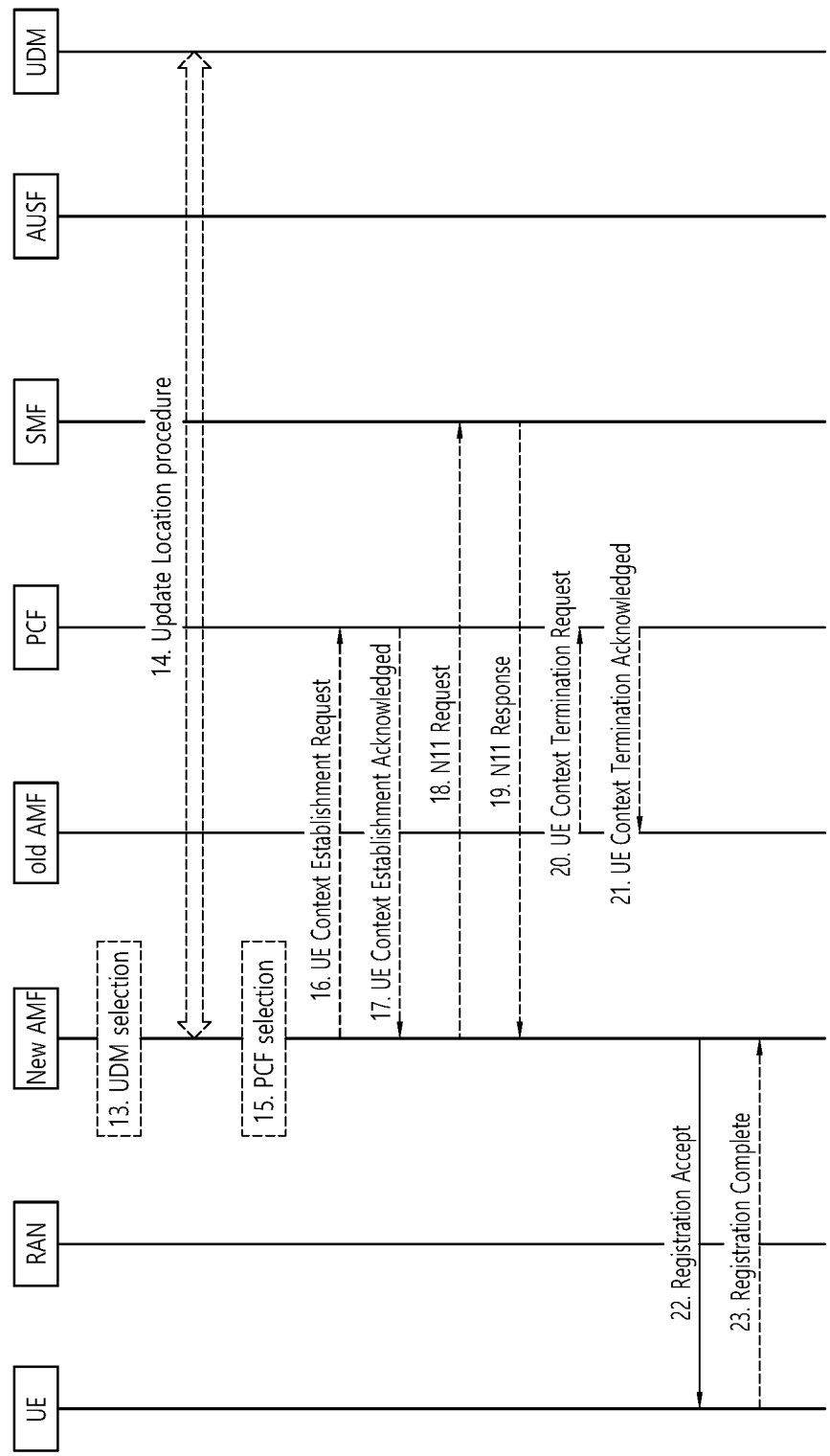

FIGS. 7a and 7b are a signal flowchart illustrating an exemplary registration procedure.)

1) The UE may transmit an AN message to the RAN. The AN message may include an AN parameter and a registration request message. The registration request message may include information, such as a register type, a subscriber permanent ID or temporary user ID, a security parameter, Network Slice Selection Assistance Information (NSSAI), 5G capability of the UE, a Protocol Data Unit (PDU) session status, and so on.

In case of a 5G RAN, the AN parameter may include a Subscription Permanent Identifier (SUPI) or a temporary user ID, a selected network, and NSSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a Public Land Mobile Network (PLMN) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Step 4 to Step 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Step 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

PDU Session Establishment Procedure

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 8A:
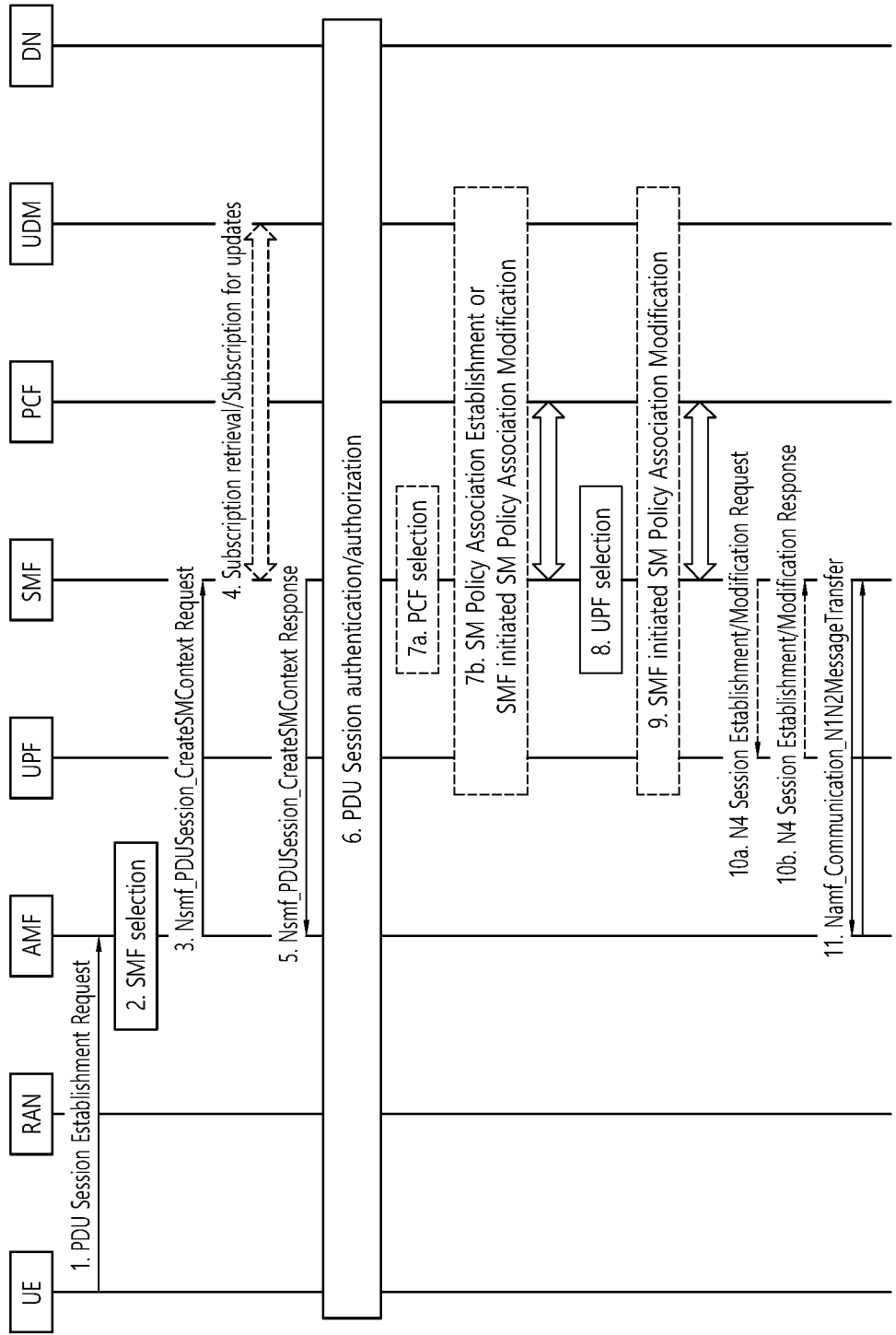
FIGS. 8a and 8b are a signal flowchart illustrating an exemplary PDU session establishment procedure.
Figure 8B:
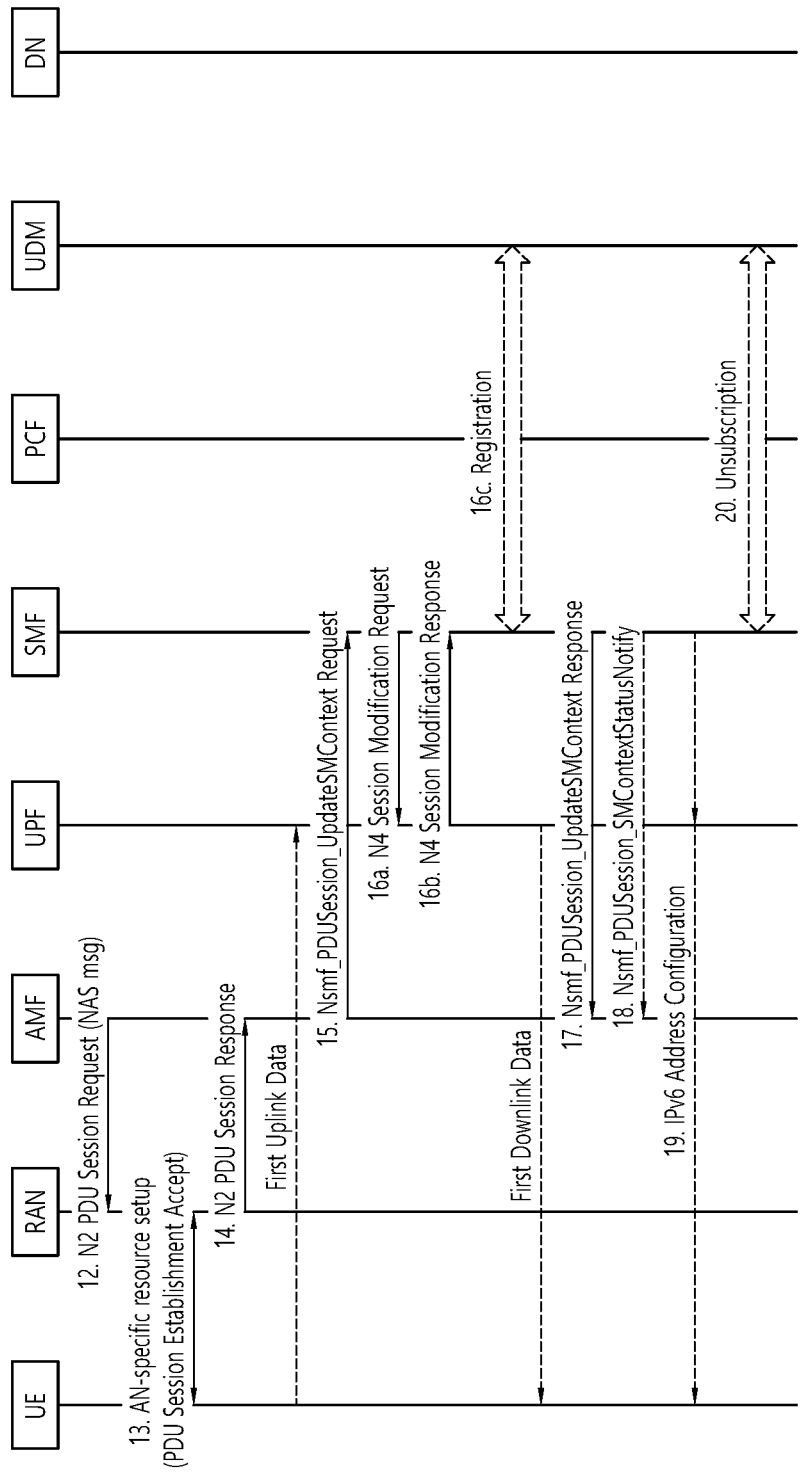

FIGS. 8a and 8b are a signal flowchart illustrating an exemplary PDU session establishment procedure.

The procedure shown in FIGS. 8a and 8b assumes that the UE has already registered on the AMF according to the registration procedure shown in FIG. 7. Therefore, it is assumed that the AMF has already acquired user subscription data from UDM.

1) The UE transmits a NAS message to the AMF. The message may include Single Network Slice Selection Assistance Information (S-NSSAI), Data network Name (DNN), PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for Home Public Land Mobile Network (HPLMN).

More specifically, the UE may extract and store the allowed NSSAI and the information on the mapped NSSAI, included in the registration accept message received from the network (i.e., AMF) in the registration procedure in FIG. 6. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

The AMF may select SMF.

3) The AMF may transmit Nsmf_PDUSession_CreateSMContext Request message or Nsmf_PDUSession_UpdateSMContext Request message to the selected SMF.

The Nsmf_PDUSession_CreateSMContext Request message may include SUPI, DNN, S-NSSAI(s), PDU Session ID, AMF ID, Request Type, PCF ID, Priority Access, N1 SM container, User location information, Access Type, PEI, GPSI, UE presence in LADN service area, Subscription For PDU Session Status Notification, DNN Selection Mode, and Trace Requirements. The SM container may include a PDU Session Establishment Request message.

The Nsmf_PDUSession_UpdateSMContext Request message may include SUPI, DNN, S-NSSAI(s), SM Context ID, AMF ID, Request Type, N1 SM container, User location information, Access Type, RAT type, and PEI. The N1 SM container may include a PDU Session Establishment Request message.

The AMF ID is used to identify the AMF serving the UE. The N1 SM information may include a PDU session establishment request message received from the UE.

4) The SMF transmits a Subscriber Data Request message to the UDM. The Subscriber Data Request message may include a subscriber permanent ID and DNN. The UDM may transmit a Subscription Data Response message to the SMF.

In the above-described step 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits Nsmf_PDUSession_CreateSMContext Response message or Nsmf_PDUSession_UpdateSMContext Response message to the AMF.

The Nsmf_PDUSession_CreateSMContext Response message may include Cause, SM Context ID, or N1 SM container. The N1 SM container may include a PDU Session Reject.

In step 3 above, when the SMF has received the Nsmf_PDUSession_CreateSMContext Request message and the SMF can process the PDU Session establishment request message, the SMF creates SM context and the SM context ID is delivered to the AMF.

6) Secondary authentication/authorization is optionally performed.

7a) If the dynamic PCC is used for the PDU session, the SMF selects the PCF.

7b) The SMF performs an SM policy association establishment procedure in order to establish an SM policy association with the PCF.

8) If the request type in step 3 indicates "initial request", the SMF selects the SSC mode for the PDU session. If step 5 is not performed, SMF may also select UPF. In case of the request type IPv4 or IPv6, the SMF may allocate an IP address/prefix for the PDU session.

9) The SMF provides information on the policy control request trigger condition by performing the SM policy association modification procedure.

10) If the request type indicates "initial request", the SMF may start the N4 session establishment procedure using the selected UPF, otherwise may start the N4 session modification procedure using the selected UPF.

10a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

10b) By transmitting an N4 Session Establishment/Modification response message, the UPF may respond. In case the CN tunnel information is allocated by the UPF, the CN tunnel information may be provided to the SMF.

11) The SMF transmits Namf_Communication_N1N2MessageTransfer message to the AMF. The Namf_Communication_N1N2MessageTransfer message may include PDU Session ID, N2 SM information, and N1 SM container.

The N2 SM information may include PDU Session ID, QoS Flow ID (QFI), QoS Profile(s), CN Tunnel Info, S-NSSAI from the Allowed NSSAI, Session-AMBR, PDU Session Type, User Plane Security Enforcement information, UE Integrity Protection Maximum Data Rate.

The N1 SM container may include a PDU session establishment accept message.

The PDU session establishment accept message may include an allowed QoS rule, SSC mode, S-NSSAI, and an assigned IPv4 address.

12) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

13) The RAN may perform a specific signaling exchange with a UE being related to the information received from the SMF.

The RAN also allocates RAN N3 tunnel information for the PDU session.

The RAN forwards the NAS message, which is provided in the step 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

14) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

15) The AMF may transmit Nsmf_PDUSession_UpdateSMContext Request message to the SMF. The Nsmf_PDUSession_UpdateSMContext Request message may include N2 SM information. Herein, the AMF may forward the N2 SM information received from the RAN to the SMF.

16a) If an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in the step 8.

16b) The UPF may transmit an N4 Session Modification Response message to the SMF.

17) The SMF transmits Nsmf_PDUSession_UpdateSMContext Response message to the AMF.

After this step, the AMF can deliver the related event to the SMF.

18) The SMF transmits Nsmf_PDUSession_SMContextStatusNotify message.

19) The SMF transmits information to the UE through the UPF. More specifically, in case of PDU Type IPv6, the SMF may generate an IPv6 Router Advertisement and may transmit the generated advertisement to the UE through the N4 and UPF.

20) During the procedure, if the PDU Session Establishment is not successful, the SMF notifies this to the AMF.

Figure 9A:
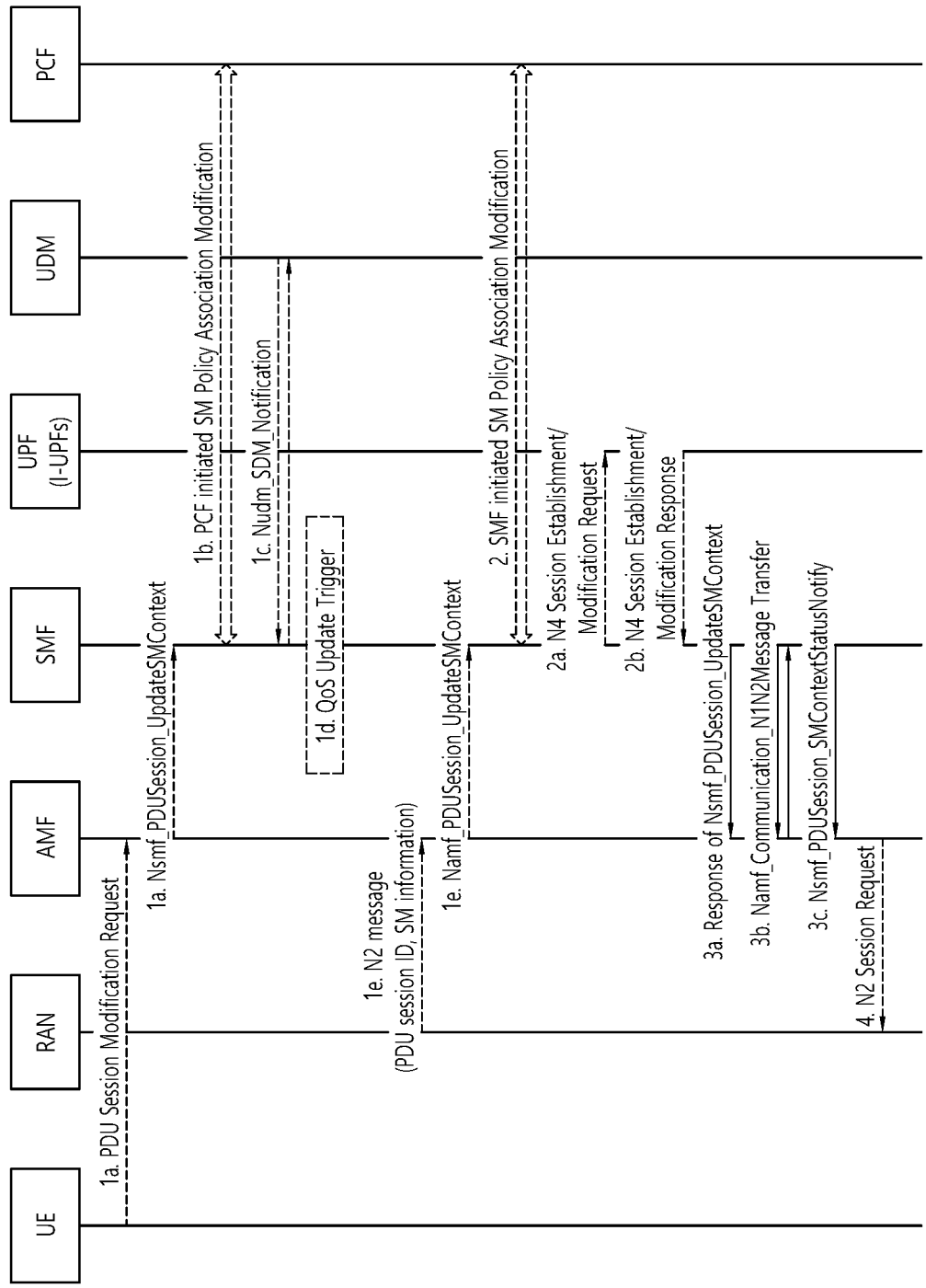

FIGS. 9a and 9b show a modification procedure for a PDU session.

The MA PDU session may be established/managed based on the PDU session modification procedure.

The PDU session modification procedure may be initiated by the UE or may be initiated by the network.

1a) When initiated by the UE, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, requested QoS information, SGSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is transmitted to an appropriate AMF according to the location information of the UE via the RAN. Then, the AMF transmits an Nsmf_PDUSession_UpdateSMContext message to the SMF. The message may include a Session Management (SM) context ID and an N1 SM container. The N1 SM container may include a PDU session modification request message.

1b) When initiated by the PCF among network nodes, the PCF may inform the SMF of the policy change by initiating an SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) When initiated by SMF among network nodes, SMF may trigger QoS update. When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include QoS Flow ID (QFI), user location information, and an indication indicating that the QoS flow is released. The AMF may transmit an Nsmf_PDUSession_UpdateSMContext message. The message may include SM context ID and N2 SM information.

2) The SMF may transmit a report on the subscription event by performing the SM policy association modification procedure. If the PDU session modification procedure is triggered by 1b or 1d, this step may be skipped. If a dynamic PCC is not deployed in the network, the SMF may apply an internal policy to decide to change the QoS profile.

Steps 3 to 7, which will be described later, may not be performed when the PDU session modification requires only the UPF operation.

3a) When initiated by the UE or AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command The PDU session modification command may include a PDU session ID, a QoS rule, a QuS rule operation, QoS flow level QoS parameters, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1 SM container may include a PDU session modification command The PDU session modification command may include a PDU session ID, a QoS rule, and a QoS flow level QoS parameters.

If the UE is in the CM-IDLE state and ATC is activated, the AMF updates and stores the UE context based on the Namf_Communication_N1N2MessageTransfer message, and then steps 3 to 7 described later may be skipped. When the UE enters the reachable state, i.e., the CM-CONNECTED state, the AMF may transmit an N1 message to synchronize the UE context with the UE.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN (i.e., gNB or base station), in order to modify the necessary AN resources related to the PDU session, an RRC connection reconfiguration procedure may be performed with the UE.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and a PDU session ID.

7) The AMF delivers the N2 SM information and user location information received from the AN to the SMF through the Nsmf_PDUSession_UpdateSMContext message. Then, the SMF delivers the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1b or step 2 above, the SMF may inform the PCF whether or not the PCC decision can be performed through the SM policy association modification procedure.

The SMF may notify the requesting entity for user location information related to the change of the PDU session.

Redundant Transmission

Meanwhile, in next-generation (i.e., fifth generation) mobile communication, redundant transmission is being discussed for URLCC.

Figure 10A:
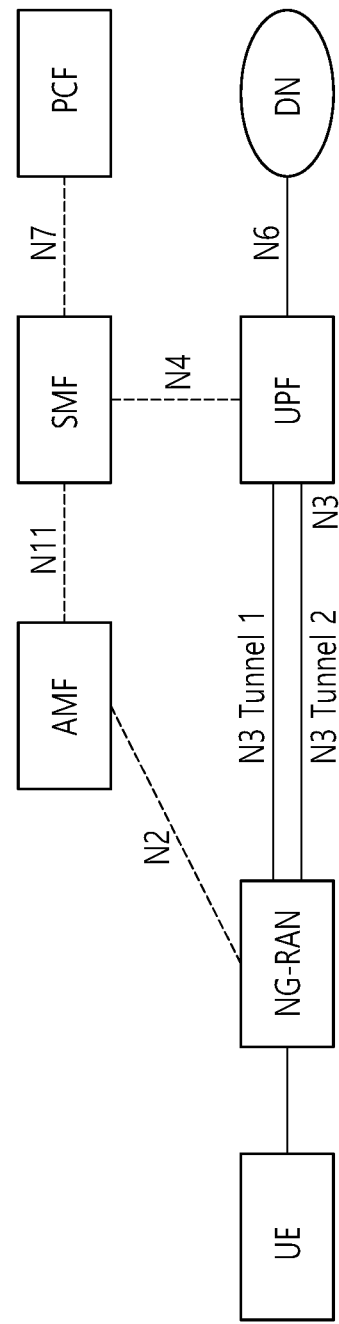
FIG. 10a shows an example of an architecture for redundant transmission.
Figure 10B:
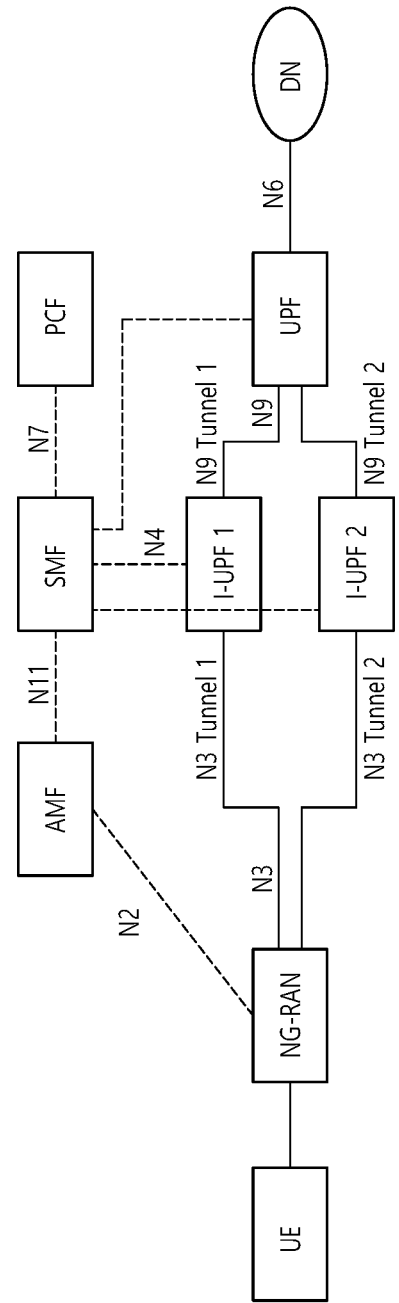
FIG. 10b shows another example of an architecture for redundant transmission.

FIG. 10a shows an example of an architecture for redundant transmission, and FIG. 10b shows another example of an architecture for redundant transmission.

As can be seen with reference to FIG. 10a, two N3 tunnels may be created between the NG-RAN and the UPF. Accordingly, data may be redundantly transmitted through the two tunnels. The NG-RAN node and the UPF may support duplication and elimination of packets.

As can be seen with reference to FIG. 10b, two intermediate UPFs between the UPF and the NG-RAN may support redundant transmission based on two N3 and N9 tunnels between the NG-RAN node and the UPF. The NG-RAN node and the UPF may support duplication and elimination of packets.

For URLCC QoS flows of a PDU session for redundant transmission established during or after URLLC QoS flow establishment, there may be two N3 and N9 tunnels between the NG-RAN and the UPF. For downlink traffic, UPF may duplicate the downlink packets of the QoS flow from the DN and assign the same GTP-U sequence number to the downlink packets. These duplicated packets may be transmitted to I-UPF 1 and I-UPF 2 through N9 tunnel 1 and N9 tunnel 2, respectively. Each I-UPF may forward packets (having the same GTP-U sequence number) received from the UPF to the NG-RAN through N3 tunnel 1 and N3 tunnel 2. The NG-RAN may eliminate duplicated packets based on the GTP-U sequence number. In the case of uplink traffic, the NG-RAN may duplicate the packet of the QoS flow from the UE and assign the same GTP-U sequence number. These duplicated packets may be transmitted to I-UPF 1 and I-UPF 2 through N3 tunnel 1 and N3 tunnel 2. Each I-UPF may forward packets (having the same GTP-U sequence number) received from the NG-RAN to the UPF through N9 tunnel 1 and N9 tunnel 2. The UPF may eliminate duplicated packets based on the GTP-U sequence number.

NWADAF (Network Data Analytics Function)

The NWDAF supporting UE mobility statistics or analytics may collect UE mobility related information from Network Function (NF) and Operations, Administration and Maintenance (OAM), and may generate UE mobility statistics or predictions through data analytics.

The service provided by the NWDAF may be used by, e.g., the AMF among several NFs.

Figure 11:
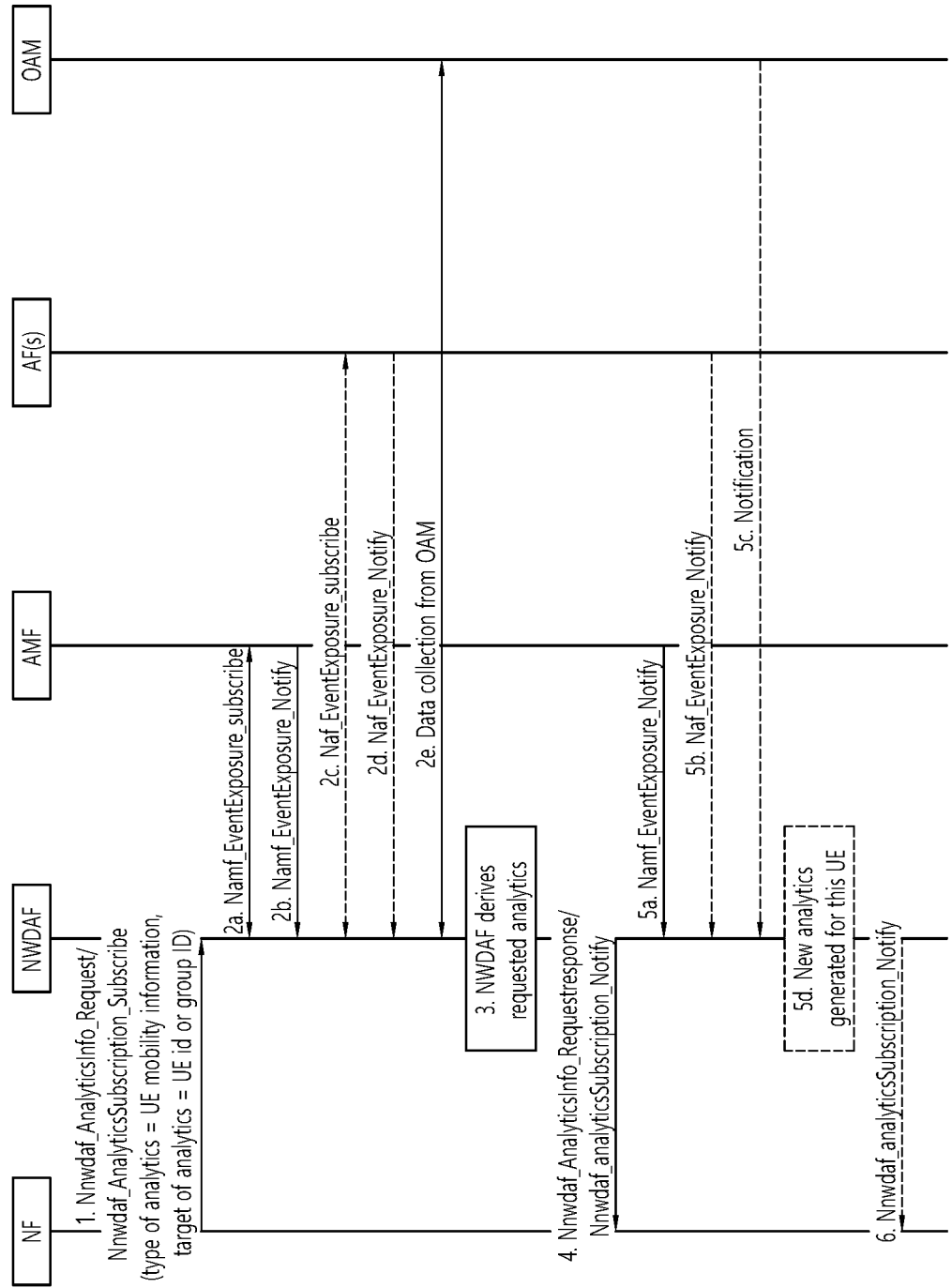
FIG. 11 is an exemplary diagram illustrating a signal flow for the operation of the NWDAF.

FIG. 11 is an exemplary diagram illustrating a signal flow for the operation of the NWDAF.

The NWDAF may provide UE mobility related analytics in the form of statistics or predictions. In FIG. 11, it is shown that the Application Function (AF) is an NF provided with a service from the NWDAF. The AF may request analytics via the NEF, and the NEF may provide the request to the NWDAF.

1) The NF may send a request message to the NWDAF for analytics on a specific UE or a group of UEs. The message may be, e.g., a message based on Nnwdaf_AnalyticsInfo or Nnwdaf_AnalyticsSubscription service. The NF may request statistics or predictions. The type of analytics may be UE mobility information. The NF may provide the UE id or the internal group ID in the target of the analytics reporting.

2) If the request is authorized and in order to provide the requested analytics, the NWDAF may subscribe to events with all the serving AMFs for notification of UE's location change. If the NWDAF has already completed the analysis, this step may not be performed.

The NWDAF subscribes the service data from to the AF. For this, a message based on Naf_EventExposure_Subscribe or Nnef_EventExposure_Subscribe service may be used.

The NWDAF collects UE mobility information from the OAM.

The NWDAF selects the AMF responsible for the UE or group of UEs.

3) The NWDAF performs the requested analytics.

4) The NWDAF provides the requested UE mobility analytics to the NF. For this, a response message to Nnwdaf_AnalyticsInfo_Reques or a Nnwdaf_AnalyticsSubscription_Notify message may be used.

5-6) if the NF has subscribed to receive notifications for UE mobility analytics, the NWDAF may generate analytics and provide them to the NF.

The disclosures of the present specification provide methods for solving the above-described problems.

Problems to be Solved by the Disclosure of the Present Specification

Research is underway to perform network automation by utilizing the information analytics/prediction function of the NWDAF, and efforts are underway to effectively provide Mobile Edge Computing (MEC) service. In particular, research is underway to optimize UP pathways.

In the case of 5G service, since more UEs receive real-time service by utilizing more network resources compared to 4G, it is important to make decisions for information analytic/resource management.

I. Overview of the Disclosures of the Present Specification

I-1. Functions of a First Network Node (e.g., NWDAF)

According to the disclosure of the present specification, a first network node (e.g., NWDAF) may obtain information of an NG-RAN serving a UE from the network node.

The first network node (e.g., NWDAF) may obtain information about QoS and data efficiency on a redundant transmission path.

In addition, the first network node (e.g., NWDAF) may analyze statistic/prediction values for efficiency of using a redundant transmission path.

In addition, the first network node (e.g., NWDAF) may transmit the analyzed statistic value and prediction value to the network node, in particular, the SMF.

I-2. Functions of a Second Network Node (e.g., SMF)

The second network node (e.g., SMF) may determine management and whether to establish a PDU session to which redundant transmission is applied by utilizing the obtained information.

When it is determined to establish a PDU session in which redundant transmission is supported, the second network node (e.g., SMF) informs the PDU Session Anchor (PSA) UPF and the NG-RAN of the redundant transmission (note that the message transmitted to the UE is via the AMF).

The second network node (e.g., SMF) may obtain, from the NWDAF, information to be used to determine how to support efficiently redundant transmission for URLCC service.

The second network node (e.g., SMF) may determine whether redundant transmission should be performed.

The second network node (e.g., SMF) may determine whether redundant transmission should be stopped if it has been activated.

II. Example of Implementations

II-1. NWDAF Assistance to Support User Plane (UP) Optimization

UP optimization may be supported for edge computing. in the edge computing environment, especially for URLLC service, the efficient UP resource usage may be supported with redundant transmission experience related analytics.

The SMF may decide that redundant transmission will be performed based on authorized 5G QoS identifier (5QI), NG-RAN node capability and/or operator configuration, and the SMF may inform the PSA UPF and the NG-RAN to perform redundant transmission via N4 interface and N2 information accordingly.

The NEDAF may transmit redundant transmission experience related analytics to the SMF, and it may have an effect on operator's policy configured in the SMF to support efficiently redundant transmission for URLLC service, i.e., to determine redundant transmission should be performed, or should be stopped.

In a variety of circumstances, such as when the UPF transmits monitoring data to the SMF, as described below, or when data can be collected directly from the RAN, the NWDAF supporting redundant transmissions experience related analytics may be able to:

i) collect UE mobility related information from NFs (e.g., AMF or AF) and OAM.

Specifically, depending on the UE mobility, since the NG-RAN to be accessed may vary and the capability related to redundant transmission of the NG-RAN may vary, the UE mobility related information may be collected for use in confirming/predicting effectiveness.

ii) collect information about packet drop and/or packet delay measurement from NFs (e.g., UPF or SMF) and OAM (in addition, from NG-RAN).

The information may be collected for the purpose of determining the status of a backhaul network.

iii) collect efficiency information on redundant transmission from NFs (e.g., UPF) and OAM (in addition, from NG-RAN).

This information may be used for the purpose of verifying whether the redundant path is actually being used effectively. That is, if sufficient QoS is guaranteed only by packets arriving on path 1, packets arriving on path 2 may be unnecessary. For example, which path data is used, which path data is treated as duplicated packets and dropped, whether data on each path is actually used and the success rate for each path may be measured.

iv) collect information related to PDU session established with redundant transmission from NF (e.g., SMF) and OAM.

The information may include the number of PDU sessions or the performance of PDU sessions. The information may be used for the purpose of confirming/predicting the effectiveness of a PDU session to which redundant transmission is applied.

perform data analytics to provide redundant transmission experience statistics or predictions.

An analytics service from the NWDAF may be provided to an NF (e.g., SMF).

An NF (e.g., SMF) receiving this analytics service may include the following in the request.

Analytics ID="Redundant Transmission Experience".

The Target of Analytics Reporting can be a single UE, any UE, or a group of UEs.

Analysis Filter Information may optionally include the following information.

a. Area of Interest;
b. S-NSSAI;
c. DNN.

An Analysis target period: Indicates the time period over which the statistics or predictions are requested.

II-1. Input Data

The NWDAF supporting data analytics on redundant transmission experience may be able to collect UE mobility information from OAM, 5GC and AFs, and service data from AF.

In addition, it may be able to collect the information for PDU session which is established with redundant transmission from NF (e.g., SMF).

The table below shows UE mobility information.

TABLE 4

| Information | Source | Description |
|---|---|---|
| UE ID | AMF | SUPI |
| UE locations (1 . . . max) | AMF | UE positions |
| >UE location | | TA or cells that the UE enters |
| >Timestamp | | A time stamp when the AMF detects the UE enters this location |
| Type Allocation code (TAC) | AMF | The UE model and vendor information. The UEs with the same TAC may have similar mobility behavior. |

The table below shows service data from AF related to UE mobility.

TABLE 5

| Information | Description |
|---|---|
| UE ID | External UE ID (i.e., GPSI) |
| Application ID | Identifying the application providing this information |
| UE trajectory (1 . . . max) | Timestamped UE positions |
| >UE location | Geographical area that the UE enters |
| >Timestamp | A time stamp when UE enters this area |

Additionally, packet drop and/or packet delay measurement may be input per different levels of granularities, i.e., per QoS flow, per UE, or per GTP-U path.

The table below shows packet drop and/or packet delay measurements.

TABLE 6

| Information | Source | description |
|---|---|---|
| UL/DL packet drop | SMF, UPF or OAM (or directly NG-RAN) | UL/DL packet drop rate measurement Measurement of dropped packets due to common network congestion and QoS issues |
| UL/DL packet delay | SMF, UPF or OAM (or directly NG-RAN) | UL/DL packet delay measurement |

The table below shows efficient measurement on redundant transmission.

TABLE 7

| Information | Source | description |
|---|---|---|
| UL/DL packet drop by redundant transmission | SMF, UPF or OAM (or directly NG-RAN) | UL/DL packet drop measurement by redundant transmission (rate and/or number of packets). That is, measurement of packets that arrive normally but are dropped as duplicates of packets from another redundant transmission path |
| UL/DL successful packet transmission | SMF, UPF or NG-RAN) OAM (or directly | UL/DL successful packet transmission measurement (rate and/or number of packets) Measurement of successfully used packets without the impact of redundant transmission paths |

The table below shows information related to PDU session established with redundant transmission.

TABLE 8

| Information | Source | description |
|---|---|---|
| DNN | SMF | Data Network Name associated for URLLC service |
| UP with redundant transmission | SMF | Ratio of successful redundant transmission setup |

II-2. Output Analytics

The NWDAF supporting data analytics on redundant transmission experience may transmit the redundant transmission experience analytics to NF (e.g., SMF).

The table below is the redundant transmission experience statistics.

TABLE 9

| Information | description |
|---|---|
| UE group ID or UE ID, any UE | Identifies a UE, any UE, or a group of UEs |
| DNN | Data Network Name associated for URLLC service |

TABLE 9-continued

| Information | description |
|---|---|
| Spatial validity | Area where the estimated redundant transmission experience applies.<br>If Area of Interest information was provided in the request or subscription, spatial validity should be the requested Area of Interest. |
| Time slot entry (1 . . . max) | List of time slots during the Analytics target period |
| >Time slot start | Time slot start within the Analytics target period |
| >Duration | Duration of the time slot (average and variance) |
| Redundant Transmission Experience | Observed statistics |
| >Ratio [0, max] | Percentage on which UE, any UE, or UE group efficiently use the PDU session with redundant transmission. |

The table below is the redundant transmission experience predictions.

TABLE 10

| Information | Description |
|---|---|
| UE group ID or UE ID, any UE | Identifies a UE or, any UE, a group of UEs |
| DNN | Data Network Name associated for URLLC service |
| Spatial validity | Area where the estimated redundant transmission Experience applies.<br>If Area of Interest information was provided in the request or subscription, spatial validity should be the requested Area of Interest. |
| Time slot entry (1 . . . max) | List of predicted time slots |
| >Time slot start | Time slot start time within the Analytics target period |
| >Duration | Duration of the time slot |
| Redundant Transmission Experience | Predicted redundant transmission experience during the Analytics target period |
| >Ratio [0, max] | Percentage on which the UE, any UE, or UE group may efficiently use the PDU session with redundant transmission. |
| >Confidence | Confidence of this prediction |

II-3. Procedures

II-3-1. Analytics Procedure

The NWDAF may provide analytics, in the form of statistics or predictions.

Figure 12:
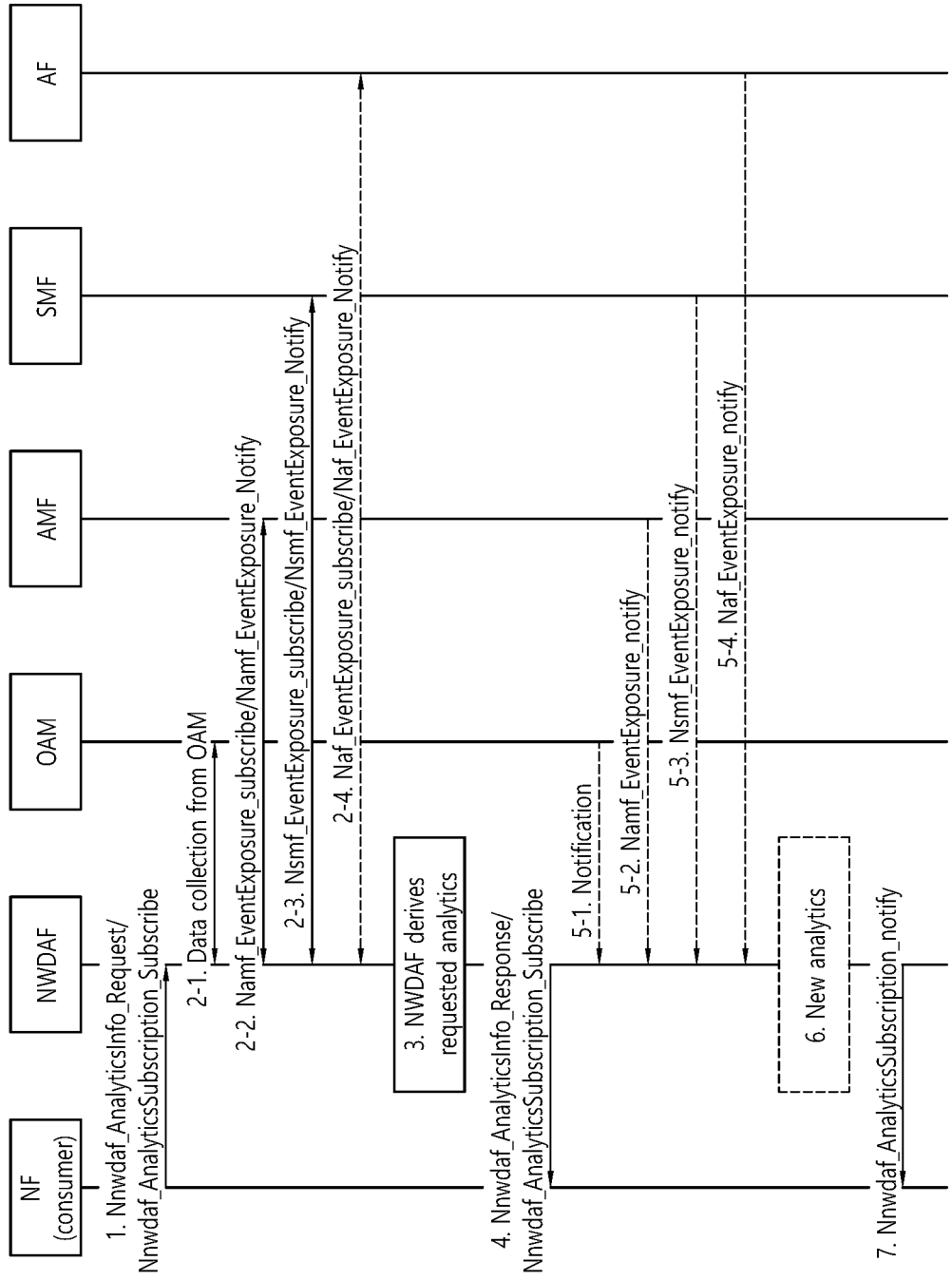
FIG. 12 is a signal flow diagram illustrating an example of providing analytics to NF.

FIG. 12 is a signal flow diagram illustrating an example of providing analytics to NF.

1) The NF may send a request message to the NWDAF for analytics on a specific UE, or a group of UEs. The message may be a message based on, e.g., the Nnwdaf_AnalyticsInfo or Nnwdaf_AnalyticsSubscription service. The NF may request statistics or predictions. The type of analytics may be redundant transmission experience. The NF may provide the UE id or internal group ID in the Target of Analytics Reporting. Analytics Filter Information may optionally contain DNN, S-NSSAI, Area of Interest, etc.

2) If the request is authorized, and in order to provide the requested analytics, the NWDAF may subscribe to events with all the serving AMFs for notification of location changes, and may subscribe to events with SMFs serving PDU session on URLLC service for notification of redundant transmission related information.

The NWDAF may subscribe the service data from AF using Naf_EventExposure_Subscribe service or Nnef_EventExposure_Subscribe.

The NWDAF may collect UE mobility information, packet measurement information and/or redundant transmission related information from OAM.

If the NWDAF already has the requested analytics, this step may be skipped.

3) The NWDAF performs analytics for the requested analytics above.

4) The NWDAF may provide the requested analytics result to the NF. For this, Nnwdaf_AnalyticsInfo_Request response message or Nnwdaf_AnalyticsSubscription_Notify message may be used.

5-7) At step 1 above, if the NF has requested redundant transmission experience analytics, upon receiving event notification messages from AMF, AF, and OAM, the NWDAF may perform analytics and provide the analytics to the NF.

If the SMF intends to use the analytics, redundant transmission experience analytics may be used to determine how to handle the PDU session. For example, redundant transmission experience analytics may be used to make decision if redundant transmission should be performed or should be stopped regarding PDU session for URLCC service.

II-3-2. Functionality Enhancements of Network Nodes

The SMF may be enhanced to obtain information from the NWDAF to make decision how to support efficiently redundant transmission for URLCC service.

The SMF, based on the obtained information, may determine that redundant transmission should be performed.

Or, may determine that redundant transmission should be stopped if it has been activated.

The NWDAF may be enhanced as follows.

The NWDAF may provide redundant transmissions experience statistics and predictions.

In the present specification, for the operation of the Nnwdaf service used in the procedure, "Redundant Transmission Experience" may be added to the analytics provided by the NWDAF as follows.

II-3-3. Changes to the Standard Specification for the Behavior of the Nnwdaf Service The table below shows services provided by the NWDAF.

TABLE 11

| Service Name | Service Operations | Operation | Service Name |
|---|---|---|---|
| Nnwdaf_AnalyticsSubscription | Subscribe | Subscribe/Notify | PCF, NSSF, AMF, SMF, NEF, AF |
|  | Unsubscribe |  | PCF, NSSF, AMF, SMF, NEF, AF |
|  | Notify |  | PCF, NSSF, AMF, SMF, NEF, AF |
| Nnwdaf_AnalyticsInfo | Request | Request/Response | PCF, NSSF, AME, SMF, NEF, AF |

The table below shows analytics information provided by the NWDAF.

TABLE 12

| Analytics Information | Request Description | Response Description |
|---|---|---|
| Slice Load level information | Analytics ID: load level information | Load level of a Network Slice Instance reported either as notification of crossing of a given threshold or as periodic notification (if no threshold is provided). |
| Observed Service experience information | Analytics ID: Service Experience | Observed Service experience statistics or predictions may be provided for a Network Slice instance or an application. They may be derived from an individual UE, a group of UEs or any UE. For slice service experience, they may be derived from an application, a set of Applications or all Applications on the Network Slice instance. |
| NF Load information | Analytics ID: NF load information | Load statistics or predictions information for specific NF(s). |
| Network Performance information | Analytics ID: Network Performance | Statistics or predictions on the load in an Area of Interest; in addition, statistics or predictions on the number of UEs that are located in that Area of Interest. |
| UE mobility information | Analytics ID: UE Mobility | Statistics or predictions on UE mobility. |
| UE Communication information | Analytics ID: UE Communication | Statistics or predictions on UE communication. |
| Expected UE behavioural parameters | Analytics ID: UE Mobility and/or UE Communication | Analytics on UE Mobility and/or UE Communication. |
| UE Abnormal behaviour information | Analytics ID: Abnormal behaviour | List of observed or expected exceptions, with Exception ID, Exception Level and other information, depending on the observed or expected exceptions. |
| User Data Congestion information | Analytics ID: User Data Congestion | Statistics or predictions on the user data congestion for transfer over the user plane, for transfer over the control plane, or for both. |
| QoS Sustainability | Analytics ID: QoS Sustainability | For statistics, the information on the location and the time for the QoS change and the threshold(s) that were crossed; or, for predictions, the information on the location and the time when a potential QoS change may occur and what threshold(s) may be crossed. |
| Redundant Transmission related information | Analytics ID: Redundant Transmission Experience | Statistics or predictions on using Redundant Transmission |

Hereinafter, examples where the analytics are used will be described.

III. Examples Where the Analytics are Used

III-1. Support of Redundant Transmission on N3/N9 Interface

During or after the URLLC QoS flow establishment process, if the SMF decided that redundant transmission can be performed based on authorized 5QI, NG-RAN node capability and/or operator configuration, the SMF may inform the UPF and NG-RAN to perform redundant transmission via N4 interface, and may deliver N2 information. In this case, the NG-RAN may provide different routing information in the tunnel information (e.g., different IP addresses). This routing information may be mapped to disjoint transport layer paths according to network deployment configuration.

In case of the deployment option using the NWDAF for URLLC service, the SMF may decide that redundant transmission shall be performed based on analytics on redundant transmission experience as well as authorized 5QI, NG-RAN node capability and/or operator configuration.

If duplication transmission is performed on N3/N9 interface, for each downlink packet of the QoS flow the UPF received from the DN, the UPF may replicate the packet and assign the same GTP-U sequence number to them for the redundant transmission.

The NG-RAN eliminates the duplicated packets based on the GTP-U sequence number and then forwards the PDU to the UE.

For each uplink packet of the QoS flow the NG-RAN received from the UE, the NG-RAN replicates the packet and assigns the same GTP-U sequence number to them for redundant transmission. These packets are transmitted to the UPF via two N3 tunnels. The UPF may eliminate the duplicated packet based on the GTP-U sequence number.

The UPF and the NG-RAN transmit packets via one or both of the tunnels per QoS flow based on the SMF instruction.

III-2. Changes to the Standard Specification for the UE Requested PDU Session Establishment Procedure The PDU session establishment procedure has already been described with reference to FIGS. 8a and 8b. In the following, the differences will be mainly explained.

In step 4, the SMF may determine whether the PDU session requires redundancy.

In case of using the NWDAF for URLCC service, the SMF may determine whether the PDU session requires redundancy or not, i.e., redundant transmission should be performed or not, based on analytics on redundant transmission experience as well as authorized 5QI, NG-RAN node capability and/or operator configuration. If the UE request is considered as not valid, the SMF may decide not to accept to establish the PDU session.

In step 10a, if the SMF decides to perform redundant transmission for the PDU session, the SMF may indicate the UPF that one CN tunnel information is used as the redundancy tunnel of the PDU session.

In case of using the NWDAF for URLCC service, the SMF may decide that redundant transmission should be performed based on analytics on redundant transmission experience as well as authorized 5QI, NG-RAN node capability and/or operator configuration.

If the SMF decides to use two I-UPFs between the UPF and the NG-RAN for redundant transmission, the SMF may request the corresponding CN tunnel information and provide it to the I-UPFs and the UPF. In case of using the NWDAF for URLLC service, the SMF may decide that redundant transmission should be performed based on analytics on redundant transmission experience as well as authorized 5QI, NG-RAN node capability and/or operator configuration. The SMF may indicate the UPF to eliminate the duplicated packet for the QoS flow in uplink direction. The SMF may indicate the UPF that the CN tunnel information is used as the redundancy tunnel of the PDU session.

In step 11, the CN tunnel information may correspond to the core network address of the N3 tunnel corresponding to the PDU session. If two CN tunnel information are included for the PDU session for redundant transmission, the SMF may indicate the NG-RAN that one of the CN tunnel information used as the redundancy tunnel of the PDU session.

If the RAN receives two CN tunnel information for a PDU session in step 12 for redundant transmission, in step 13, the RAN may allocate two AN tunnel information and indicate to the SMF that one of the AN tunnel information is used as the redundancy tunnel of the PDU session.

In step 16a, if the SMF decides to perform redundant transmission for one or more QoS flows, the SMF may indicate the UPF to perform packet duplication for the QoS flows in downlink direction. In the case of redundant transmission with two I-UPFs for one or more QoS flows, the SMF may provide AN tunnel information to two I-UPFs and indicate the UPF to perform packet duplication.

The SMF may provide UL tunnel information and DL tunnel information of the two I-UPFs to the UPF.

In case of using the NWDAF for URLLC service, the SMF may decide that redundant transmission should be performed based on analytics on redundant transmission experience as well as authorized 5QI, NG-RAN node capability and/or operator configuration.

III-3. Changes to the Standard Specification for PDU Session Modification Procedure The PDU session modification procedure has already been described with reference to FIGS. 9a and 9b. In the following, the differences will be mainly explained.

In step 2a, if redundant transmission has not been activated to the PDU session, the SMF may decide to perform redundant transmission for the QoS flow, and the SMF may indicate to the UPF to perform packet duplication and elimination for the QoS flow.

In case of using the NWDAF for URLLC service, the SMF may decide that redundant transmission should be performed based on analytics on redundant transmission experience as well as authorized 5QI, NG-RAN node capability and/or operator configuration.

If redundant transmission has been activated on the PDU session, and the SMF decides to stop redundant transmission, the SMF may indicate the UPF to release the CN tunnel information which is used as the redundancy tunnel of the PDU session, and may also indicate the UPF to stop packet duplication and elimination for the corresponding QoS flow.

In case of using the NWDAF for URLLC service, the SMF may decide to stop redundant transmission based on analytics on redundant transmission experience as well as authorized 5QI, NG-RAN node capability and/or operator configuration.

If redundant transmission has not been activated to the PDU session and the SMF decides to perform redundant transmission for the QoS flow with two I-UPFs between the PSA and the NG-RAN, the SMF may send a N4 session establishment request message to the I-UPFs. The message may include UL CN tunnel information of the UPF and a request to allocate CN tunnel information.

In case of using the NWDAF for URLLC service, the SMF may decide that redundant transmission should be performed based on analytics on redundant transmission experience as well as authorized 5QI, NG-RAN node capability and/or operator configuration.

In case of using the NWDAF for URLLC service, the SMF may decide to stop redundant transmission based on analytics on redundant transmission experience as well as authorized 5QI, NG-RAN node capability and/or operator configuration.

In step 3a, if the SMF decides to activate redundant transmission, the SMF may include additional CN tunnel information in the N2 SM information.

If redundant transmission has been activated on the PDU session, and the SMF decides to stop redundant transmission, the SMF may release the AN tunnel and request the UPF to stop packet duplication and elimination associated with the redundancy tunnel of the PDU session.

In case of using the NWDAF for URLLC service, the SMF may decide to stop redundant transmission based on analytics on redundant transmission experience as well as authorized 5QI, NG-RAN node capability and/or operator configuration.

In step 3b, if redundant transmission has been activated on the PDU session, and the SMF decides to stop redundant transmission, the SMF may indicated the RAN to release the AN tunnel, and stop packet duplication packets and elimination associated with the redundancy tunnel of the PDU session.

In case of using the NWDAF for URLLC service, the SMF may decide to stop redundant transmission based on analytics on redundant transmission experience as well as authorized 5QI, NG-RAN node capability and/or operator configuration.

In step 8, if an additional AN tunnel information is returned by the RAN, the SMF may inform the UPF about the AN tunnel information for redundant transmission. In the case of redundant transmission with two I-UPFs, SMF may provide AN tunnel information to two I-UPFs. If CN tunnel information of two I-UPFs is allocated by the UPF, the SMF may provide the two DL CN tunnel information to the UPF.

Figure 13:
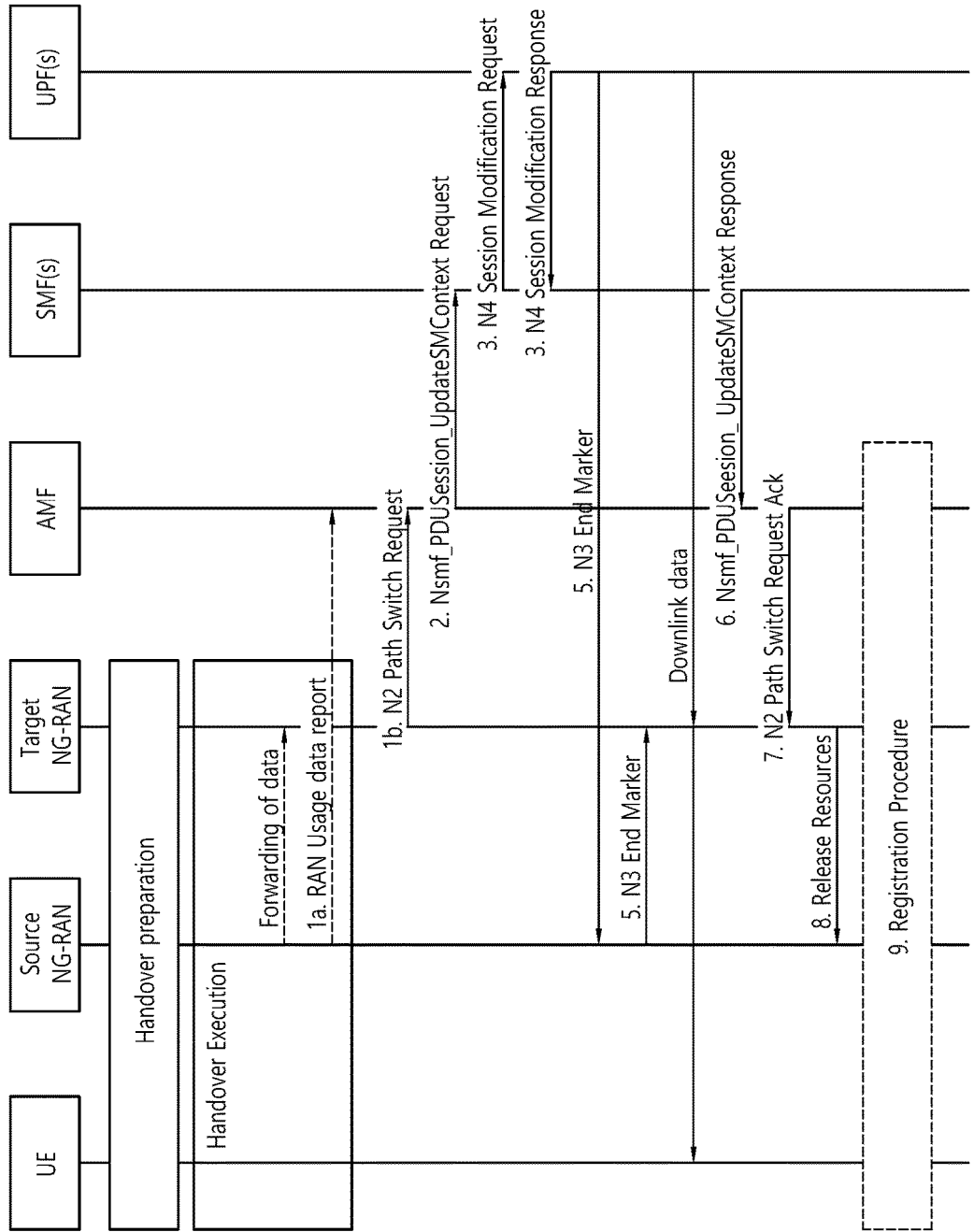
FIG. 13 is an exemplary diagram illustrating an Xn based inter NG-RAN handover procedure without user plane reallocation.

III-4. Changes to the Standard Specification for Xn Based Inter NG-RAN Handover Procedure FIG. 13 is an exemplary diagram illustrating an Xn based inter NG-RAN handover procedure without user plane reallocation.

Hereinafter, among the steps shown in FIG. 13, only contents related to redundant transmission will be described.

In step 4, in case of using the NWDAF for URLLC service, the SMF may decide that redundant transmission should be performed based on analytics on redundant transmission experience as well as authorized 5QI, NG-RAN node capability and/or operator configuration.

In step 6, if redundant transmission is performed for one or more QoS flows of a PDU session, two CN tunnel information may be sent, and the SMF may indicate to the target NG-RAN that one of the two CN tunnels is used as the redundancy tunnel of the PDU session.

In case of using the NWDAF for URLLC service, the SMF may decide that redundant transmission should be performed based on analytics on redundant transmission experience as well as authorized 5QI, NG-RAN node capability and/or operator configuration.

Figure 14A:
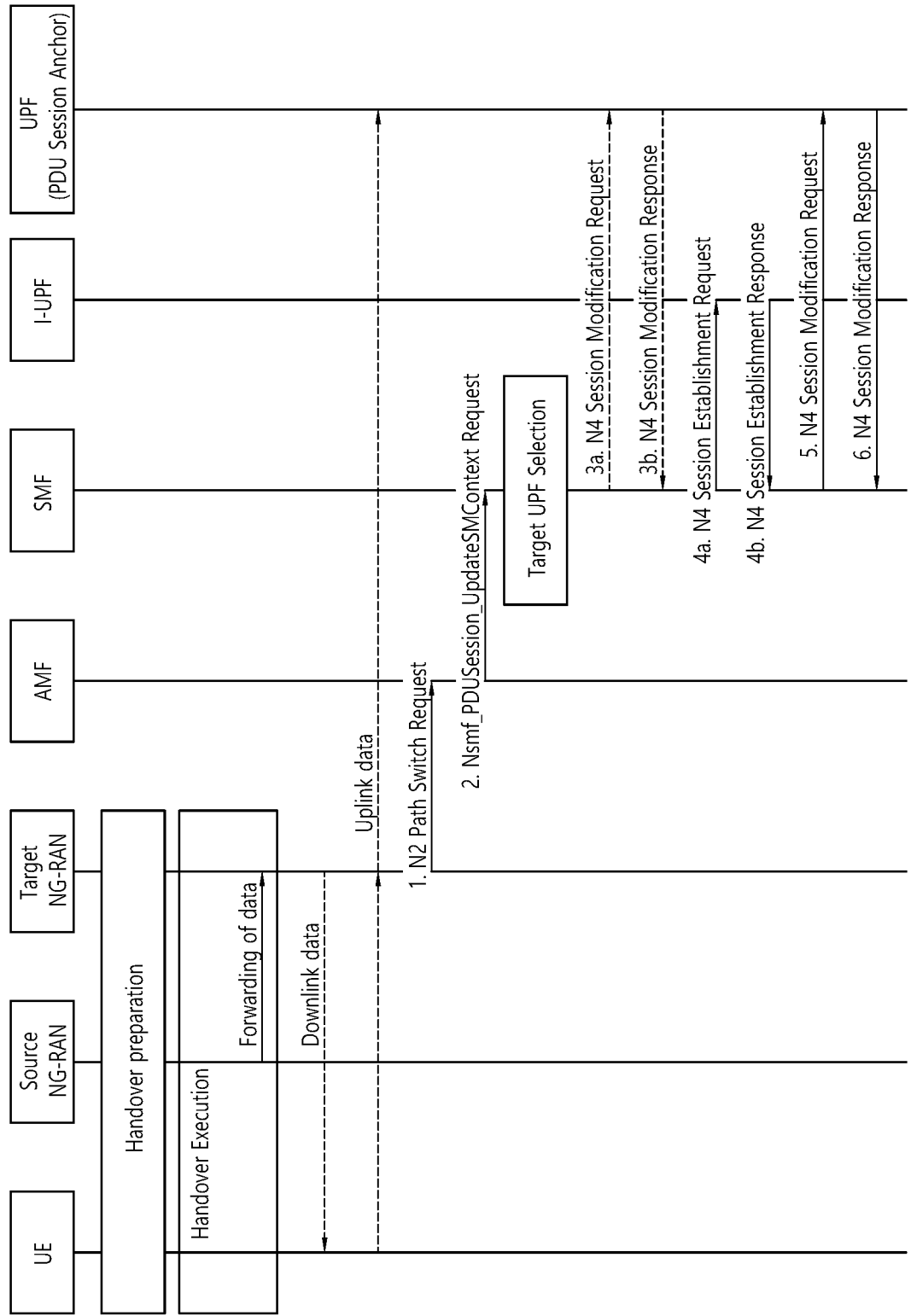
FIGS. 14a and 14b are exemplary diagrams illustrating an Xn based inter NG-RAN handover procedure when an intermediate UPF exists.
Figure 14B:
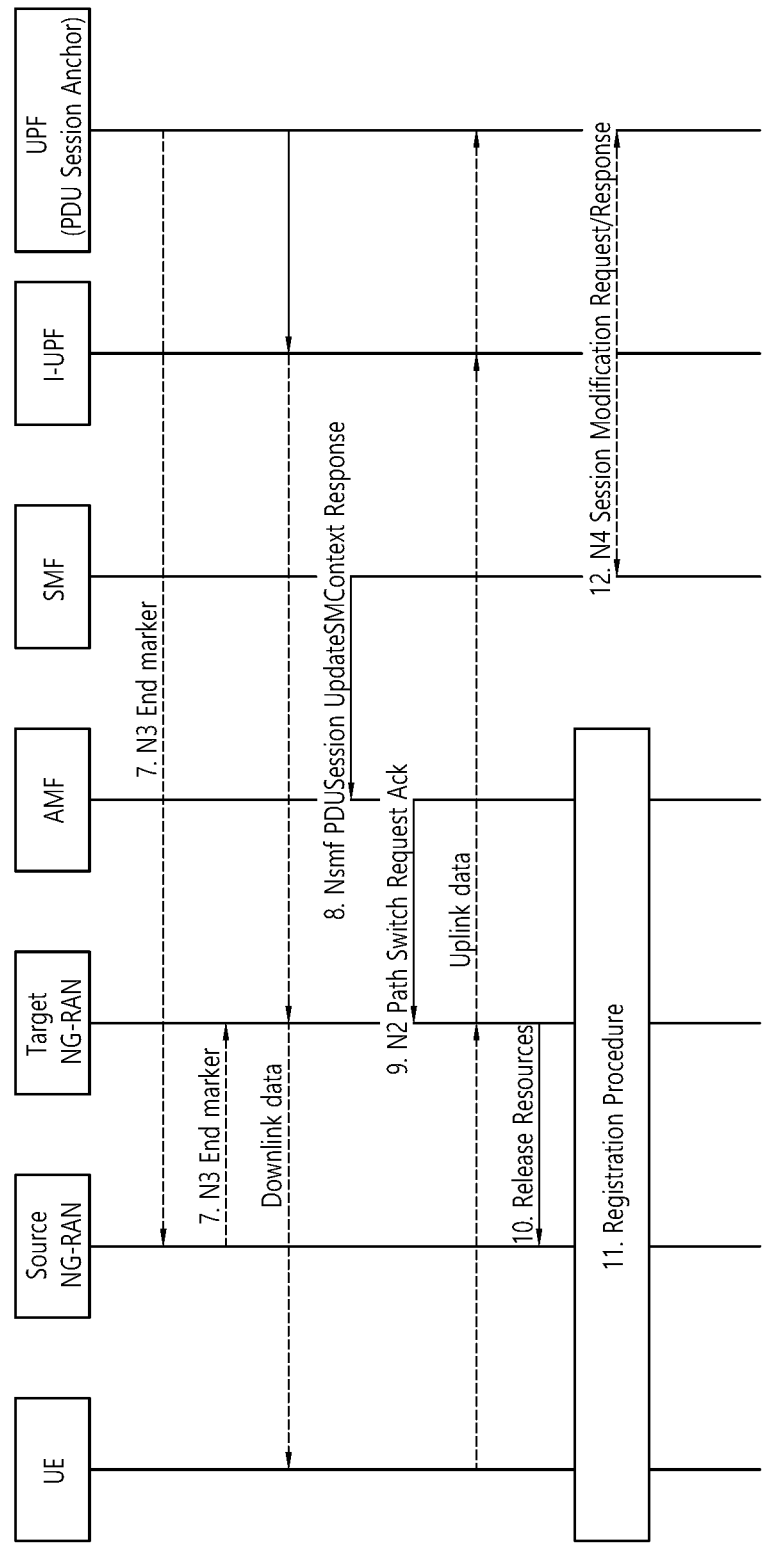

FIGS. 14*a* and 14*b* are exemplary diagrams illustrating an Xn based inter NG-RAN handover procedure when an intermediate UPF exists.

If redundant transmission is performed for one or more QoS flows of a PDU session to be switched to the target NG-RAN, the SMF may select two intermediate UPFs (i.e., I-UPFs) and set up two N3 and N9 tunnels between the target NG-RAN and the UPF via the two I-UPFs.

In case of using the NWDAF for URLLC service, the SMF may decide that redundant transmission should be performed based on analytics on redundant transmission experience as well as authorized 5QI, NG-RAN node capability and/or operator configuration.

Hereinafter, all steps shown in FIG. 14 will not be described, and only contents related to redundant transmission will be described.

In step 3b, the UPF may send an N4 session establishment response message to the SMF. The UPF may provide CN tunnel information to the SMF. If redundant transmission is performed for one or more QoS flows of the PDU session, the UPF may provide two CN tunnel information to the SMF and indicate the SMF that one of the CN tunnel information is used as the redundancy tunnel of the PDU session. The UPF may associate the CN tunnel information with UL packet detection provided by the SMF.

In case of using the NWDAF for URLLC service, the SMF may decide that redundant transmission should be performed based on analytics on redundant transmission experience as well as authorized 5QI, NG-RAN node capability and/or operator configuration.

In step 4b, the I-UPF may send an N4 session establishment response message to the SMF. The UL and DL CN tunnel information of I-UPF may be sent to the SMF.

If the SMF selects two intermediate UPFs (i.e., I-UPFs) to perform redundant transmission for a PDU session, steps 4a and 4b may be performed between the SMF and each I-UPF. In case of using the NWDAF for URLLC service, the SMF may decide that redundant transmission should be performed based on analytics on redundant transmission experience as well as authorized 5QI, NG-RAN node capability and/or operator configuration.

In step 5, if redundant transmission is performed for one or more QoS flows of the PDU session, the SMF may provide two DL CN tunnel information to the UPF and indicate to the UPF one of the DL CN tunnel information is used as the redundancy tunnel of the PDU session. In case of using the NWDAF for URLLC service, the SMF may decide that redundant transmission should be performed based on analytics on redundant transmission experience as well as authorized 5QI, NG-RAN node capability and/or operator configuration.

Figure 15:
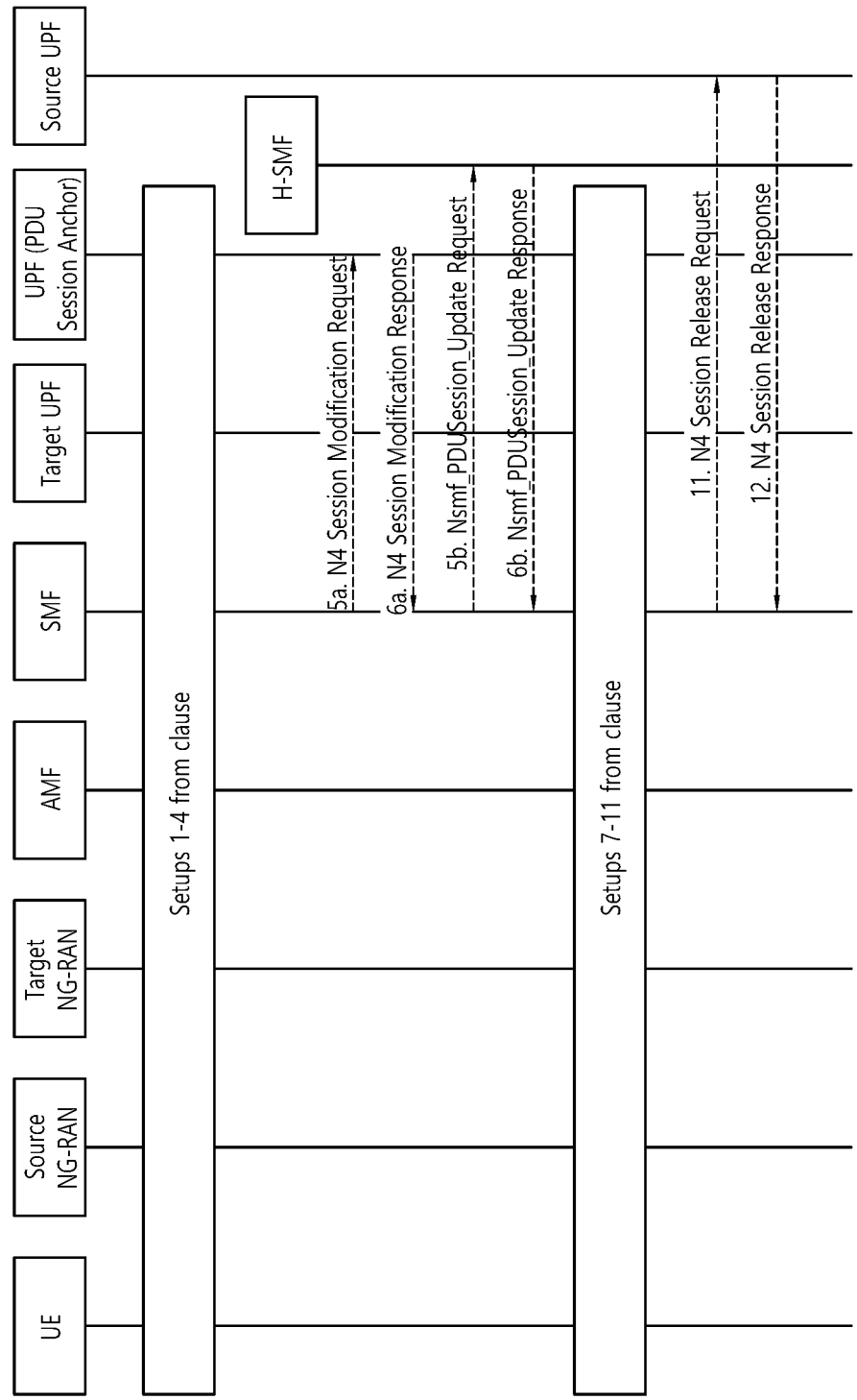
FIG. 15 is an exemplary diagram illustrating an Xn based inter NG-RAN handover when an intermediate UPF is reallocated.

FIG. 15 is an exemplary diagram illustrating an Xn based inter NG-RAN handover when an intermediate UPF is reallocated.

Hereinafter, all steps shown in FIG. 15 will not be described, and only contents related to redundant transmission will be described.

The SMF may send N4 session modification request message to the PDU session anchor. The DL CN tunnel information of the target UPF may be included in this message. If redundant transmission is performed for one or more QoS flows of the PDU session, the SMF may provide two DL CN tunnel information to the UPF and indicate to the UPF one of the DL CN tunnel information is used as the redundancy tunnel of the PDU session.

In case of using the NWDAF for URLLC service, the SMF may decide that redundant transmission should be performed based on analytics on redundant transmission experience as well as authorized 5QI, NG-RAN node capability and/or operator configuration.

Figure 16A:
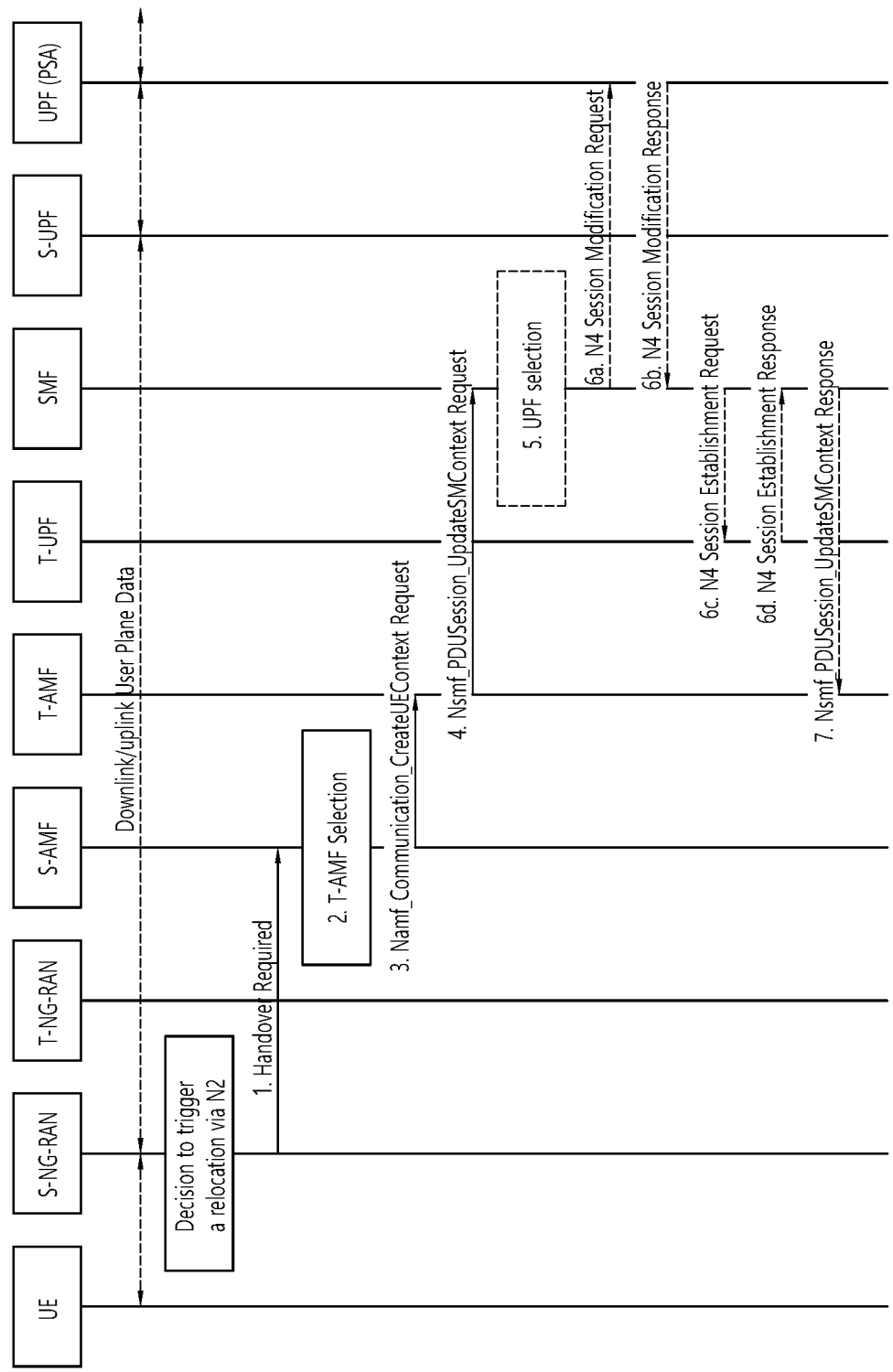
FIGS. 16a and 16b are exemplary diagrams illustrating an inter NG-RAN node N2 based handover procedure in an environment without an Xn interface.
Figure 16B:
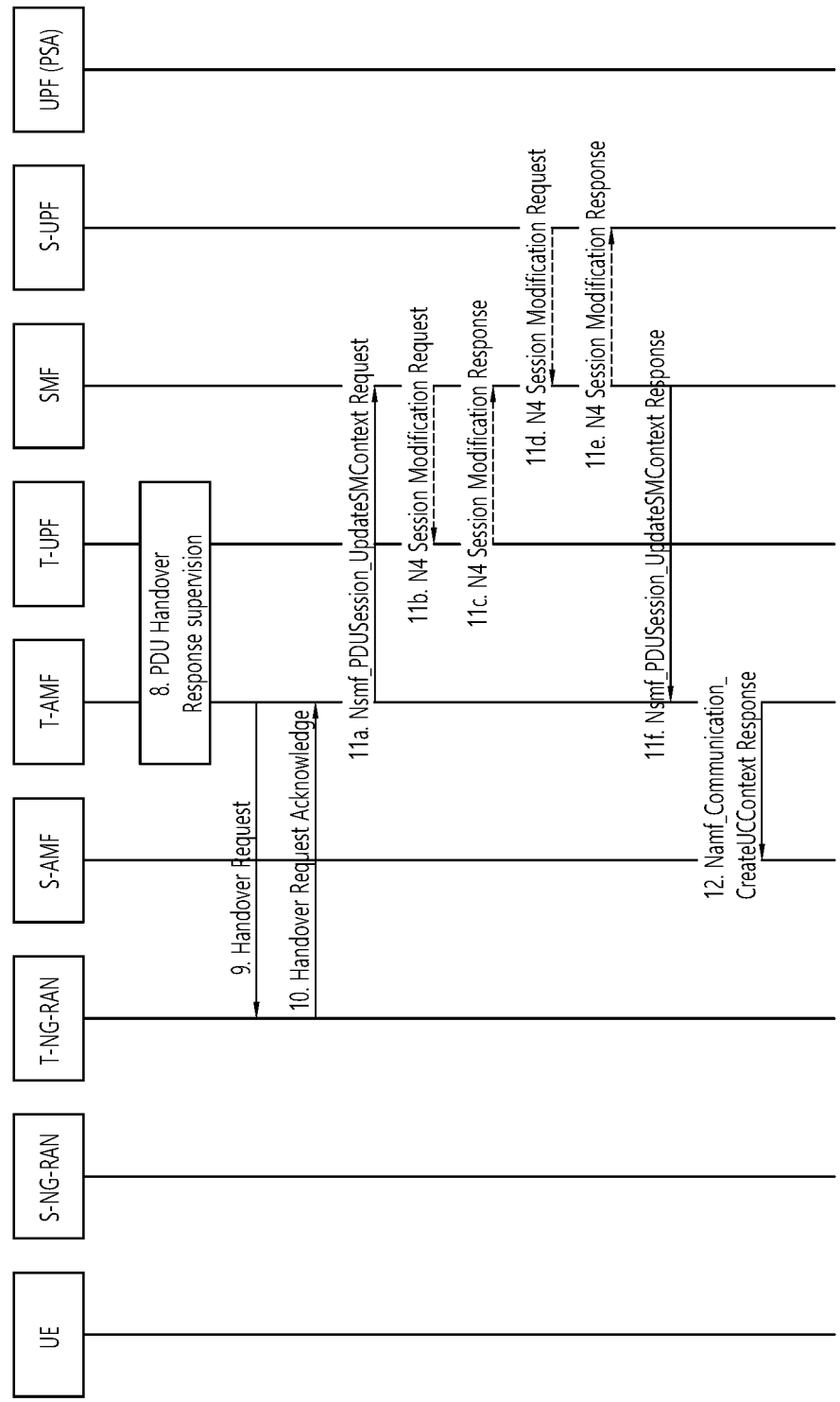

III-5. Changes to the Standard Specification for Inter NG-RAN Node N2 Based Handover Procedure FIGS. 16a and 16b are exemplary diagrams illustrating an inter NG-RAN node N2 based handover procedure in an environment without an Xn interface.

Hereinafter, all steps shown in FIGS. 16a and 16b will not be described, and only contents related to redundant transmission will be described.

In step 5, if redundant transmission is performed for one or more QoS flows of the PDU session, the SMF may select two intermediate UPFs to support redundant transmission based on two N3 and N9 tunnels between the T-RAN and the UPF.

In step 6a, if redundant transmission is performed for one or more QoS flows of the PDU session and the different CN tunnel information need to be used, the SMF may provide two CN tunnel information to the UPF if the CN tunnel information is allocated by the SMF. In addition, the SMF may indicated to the UPF one CN tunnel information is used as redundancy tunnel of the PDU session.

In case of using the NWDAF for URLLC service, the SMF may decide that redundant transmission should be performed based on analytics on redundant transmission experience as well as authorized 5QI, NG-RAN node capability and/or operator configuration.

In step 6b, if redundant transmission is performed for one or more QoS flows of the PDU session, the UPF may provide two CN tunnel information of the UPF to the SMF and indicate the SMF that one CN tunnel information is used as redundancy tunnel of the PDU session. The UPF may associate the CN tunnel information with UL packet detection rules provided by the SMF.

In case of using the NWDAF for URLLC service, the SMF may decide that redundant transmission should be performed based on analytics on redundant transmission experience as well as authorized 5QI, NG-RAN node capability and/or operator configuration.

In step 7, if redundant transmission is performed for one or more QoS flows of the PDU session, two UL CN tunnel information may be included in the N2 SM information. In case of using the NWDAF for URLLC service, the SMF may decide that redundant transmission should be performed based on analytics on redundant transmission experience as well as authorized 5QI, NG-RAN node capability and/or operator configuration.

In step 10, If redundant transmission is performed for one or more QoS flows of the PDU session, the T-RAN may include two AN tunnel information for the PDU session in the N2 SM information.

Figure 17A:
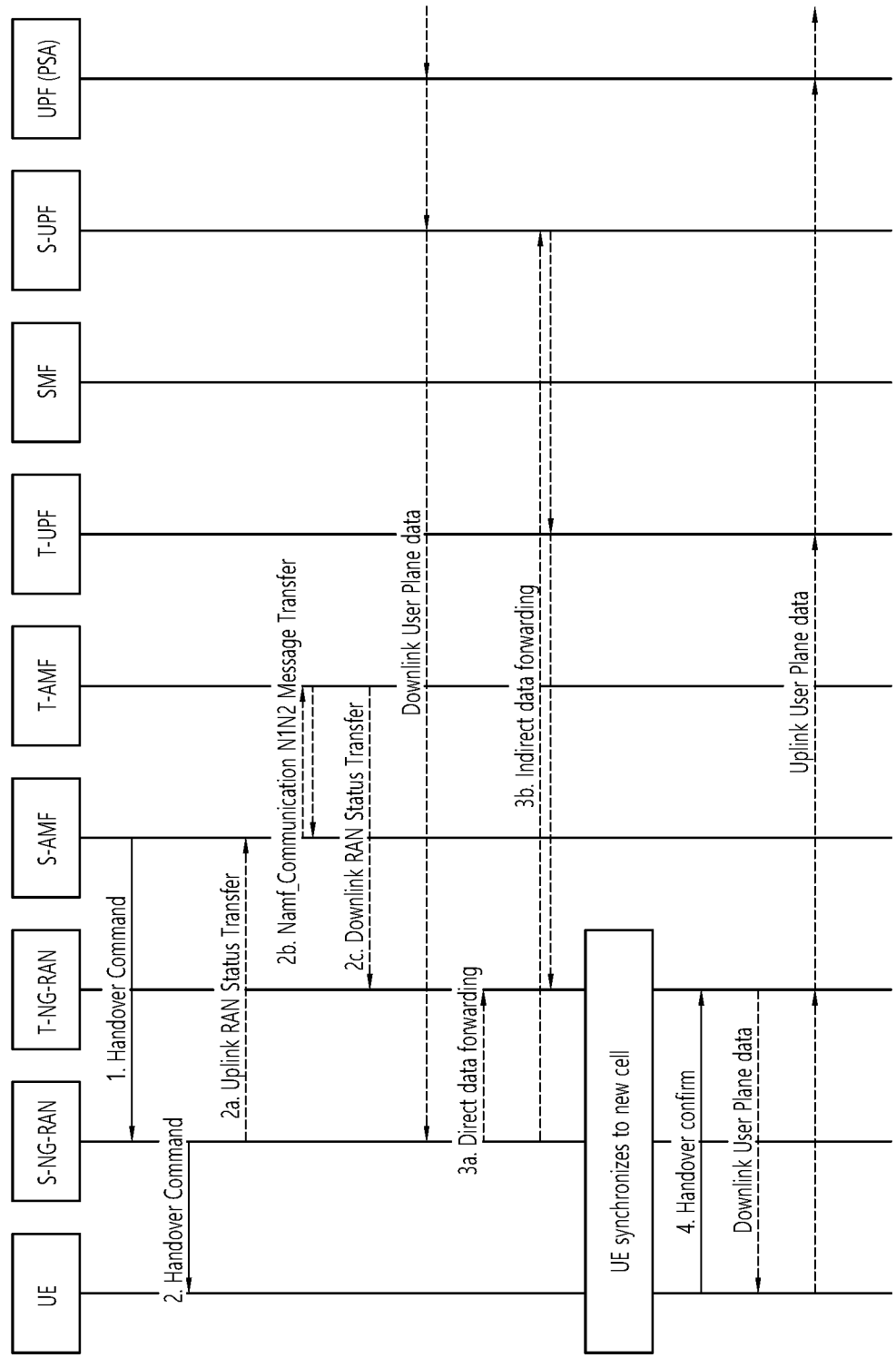
FIGS. 17a to 17c are exemplary diagrams illustrating an inter NG-RAN node N2 based handover procedure in an environment without an Xn interface.
Figure 17B:
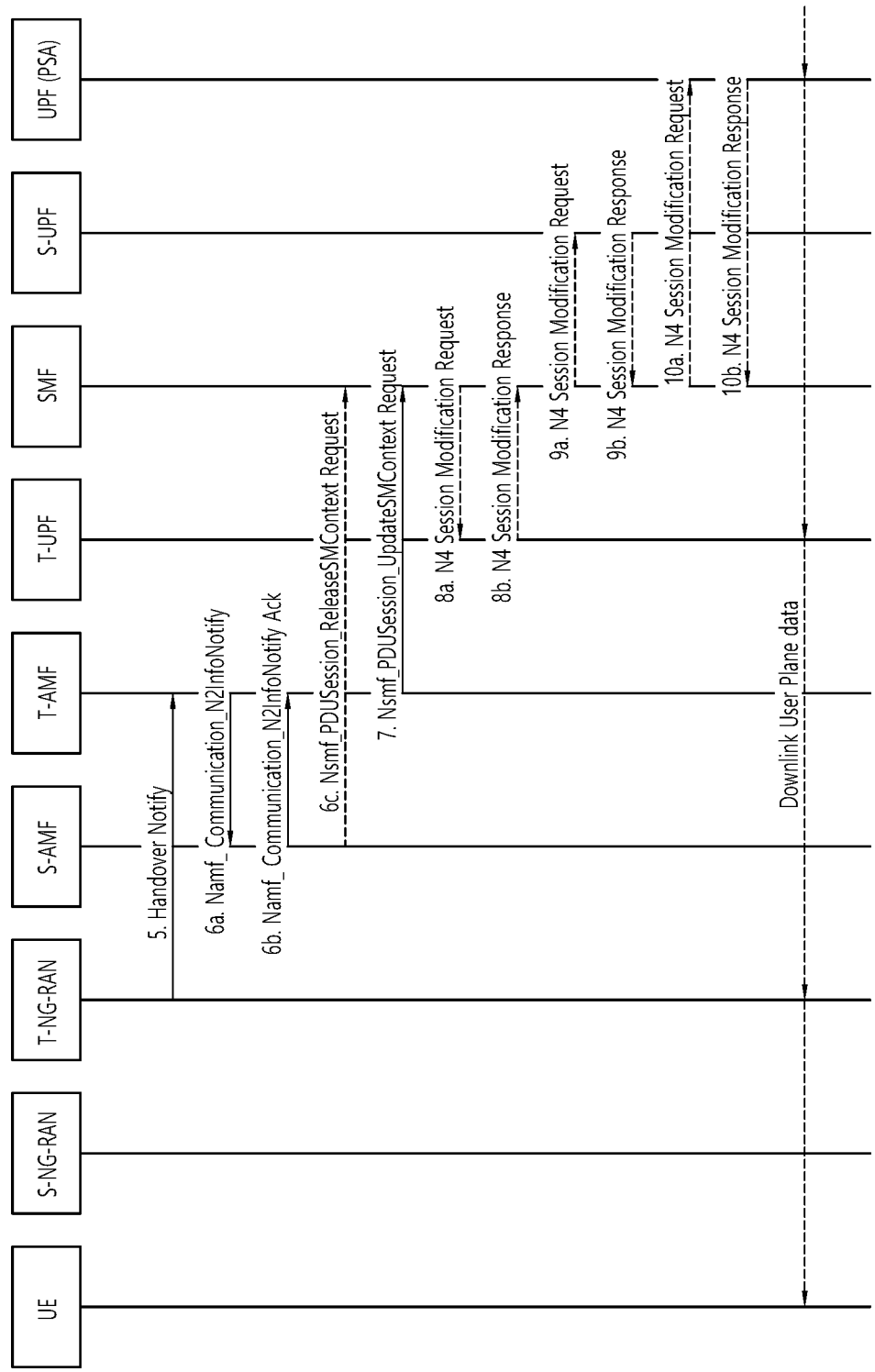
Figure 17C:
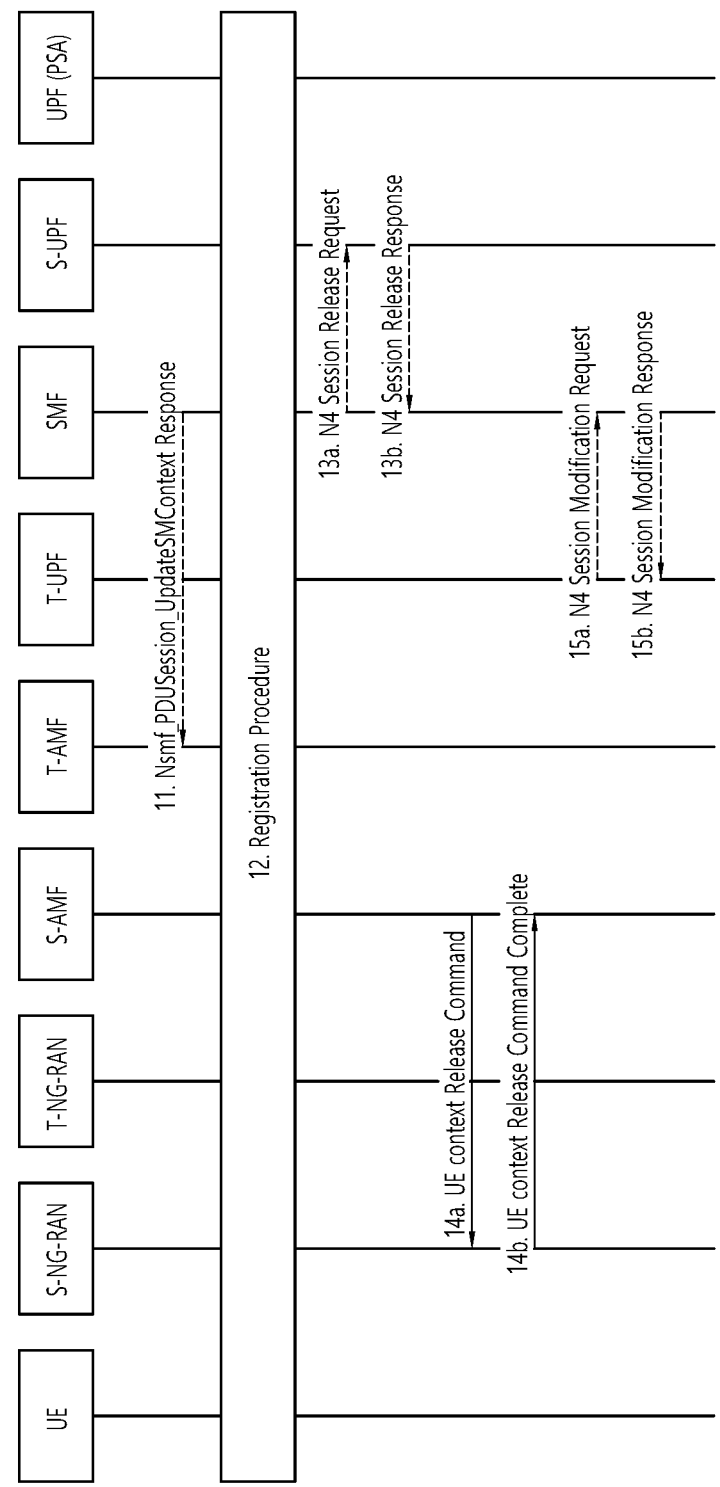

FIGS. 17a to 17c are exemplary diagrams illustrating an inter NG-RAN node N2 based handover procedure in an environment without an Xn interface.

Hereinafter, all steps shown in FIGS. 17a to 17c will not be described, and only contents related to redundant transmission will be described.

If redundant transmission is performed for one or more QoS flows of the PDU session, two N3 AN tunnel information of T-RAN or two DL CN tunnel information of two T-UPFs may be provided, and the SMF may indicate to the UPF one of the AN/CN tunnel information is used as redundancy tunnel of the PDU session.

In case of using the NWDAF for URLLC service, the SMF may decide that redundant transmission should be performed based on analytics on redundant transmission experience as well as authorized 5QI, NG-RAN node capability and/or operator configuration.

IV. Summary of the Disclosure of the Present Specification

According to the disclosure of the present specification, the first network control node (e.g., NWDAF) may collect and analyze information on redundant transmission paths.

The second network control node (e.g., SMF) may obtain the analyzed information and determine whether to establish a PDU session to which redundant transmission is applied and a UP resource management method.

Figure 18:
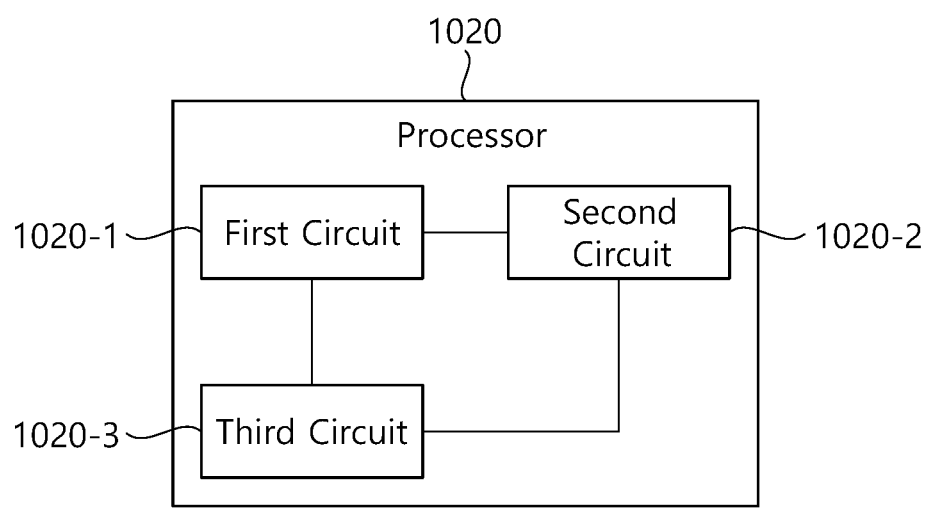
FIG. 18 shows a block diagram of a processor in which the disclosure of the present specification is implemented.

FIG. 18 shows a block diagram of a processor in which the disclosure of the present specification is implemented.

As can be seen with reference to FIG. 18, a processor 1020 in which the disclosure of the present specification is implemented may include a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and includes at least one of a Digital Signal Processor (DSP), a Central Processing Unit (CPU), and a Graphics Processing Unit (GPU).

The processor may be included in the UE, the base station, the AMF or the SMF.

A case in which the processor is included in the SMF will be described.

The first circuit 1020-1 of the processor included in the SMF may obtain analytics information from a Network Data Analytics Function (NWDAF) node. The obtained analytics information may include experience analytics information about redundant transmission.

The second circuit 1020-2 of the processor included in the SMF may, based on the analytics information, determine that the PDU session is redundantly transmitted through two tunnels during a procedure related to the PDU session.

The procedure related to the PDU session may include one or more of: a PDU session establishment procedure, a PDU session modification procedure, and a handover procedure.

The second circuit 1020-2 of the processor included in the SMF may, for the determination, consider authorized 5G QoS Identifiers (5QIs), NG-RAN node capabilities and/or operator configurations.

The experience analytics information about redundant transmission may include: a Data Network Name (DNN); observed statistics; and a percentage on which a UE, any UE, or UE group efficiently use the PDU session with redundant transmission.

The analytics information may be derived by a Network Data Analytics Function (NWDAF) node based on one or more of: a Uplink (UL)/Downlink (DL) packet drop ratio, a UL/DL packet drop rate and/or number of packets due to redundant transmission, and a successful UL/DL transmission rate and/or number of packets.

The third circuit 1020-3 of the processor included in the SMF may, when redundant transmission is performed for one or more QoS flows of a PDU session to be switched to a target NG-RAN, select two intermediate User Plane Functions (I-UPFs).

The fourth circuit (not shown) of the processor included in the SMF may, when the SMF node decides to perform redundant transmission for one or more QoS flows, indicate a UPF to perform packet duplication for QoS flows in downlink direction.

The fifth circuit (not shown) of the processor included in the SMF may, when redundant transmission has been activated on the PDU session and the SMF decides to stop redundant transmission, release an AN tunnel, and request to a UPF to stop packet duplication and elimination associated with the redundancy tunnel of the PDU session.

Figure 19:
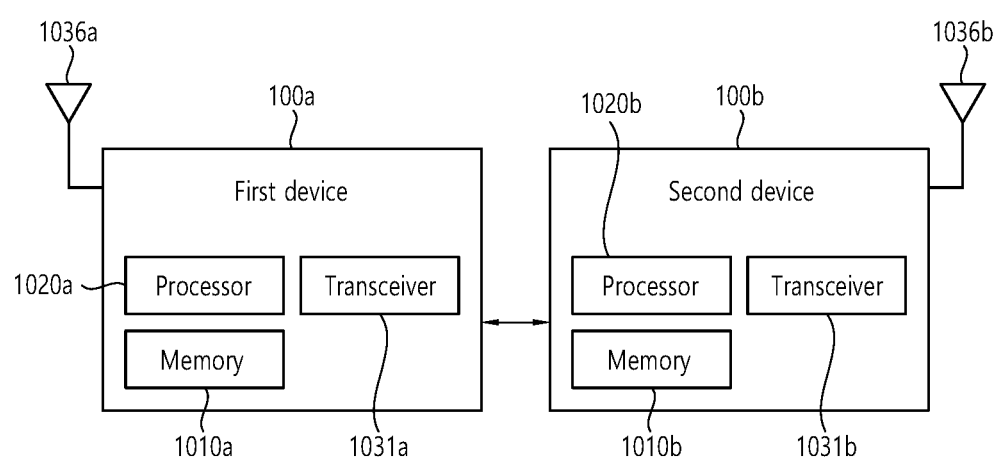
FIG. 19 illustrates a wireless communication system according to an embodiment.

FIG. 19 illustrates a wireless communication system according to an embodiment.

Referring to FIG. 19, the wireless communication system may include a first device 100*a* and a second device 100*b*.

The first device 100*a* may be a UE described in the disclosure of the present specification. Or, the first device 100*a* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a network node (e.g., AMF or MME) described in the disclosure of the present specification. Or, the second device 100*b* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100*a* may include at least one processor such as a processor 1020*a*, at least one memory such as memory 1010*a*, and at least one transceiver such as a transceiver 1031*a*. The processor 1020*a* may perform the above-described functions, procedures, and/or methods. The processor 1020*a* may perform one or more protocols. For example, the processor 1020*a* may perform one or more layers of a radio interface protocol. The memory 1010*a* is connected to the processor 1020*a*, and may store various forms of information and/or instructions. The transceiver 1031*a* is connected to the processor 1020*a*, and may be controlled to transmit and receive radio signals.

The second device 100*b* may include at least one processor such as a processor 1020*b*, at least one memory device such as memory 1010*b*, and at least one transceiver such as a transceiver 1031*b*. The processor 1020*b* may perform the above-described functions, procedures and/or methods. The processor 1020*b* may implement one or more protocols. For example, the processor 1020*b* may implement one or more layers of a radio interface protocol. The memory 1010*b* is connected to the processor 1020*b*, and may store various forms of information and/or instructions. The transceiver 1031*b* is connected to the processor 1020*b* and may be controlled transmit and receive radio signals.

The memory 1010*a* and/or the memory 1010*b* may be connected inside or outside the processor 1020*a* and/or the processor 1020*b*, respectively, and may be connected to another processor through various technologies, such as a wired or wireless connection.

The first device 100*a* and/or the second device 100*b* may have one or more antennas. For example, an antenna 1036*a* and/or an antenna 1036*b* may be configured to transmit and receive radio signals.

Figure 20:
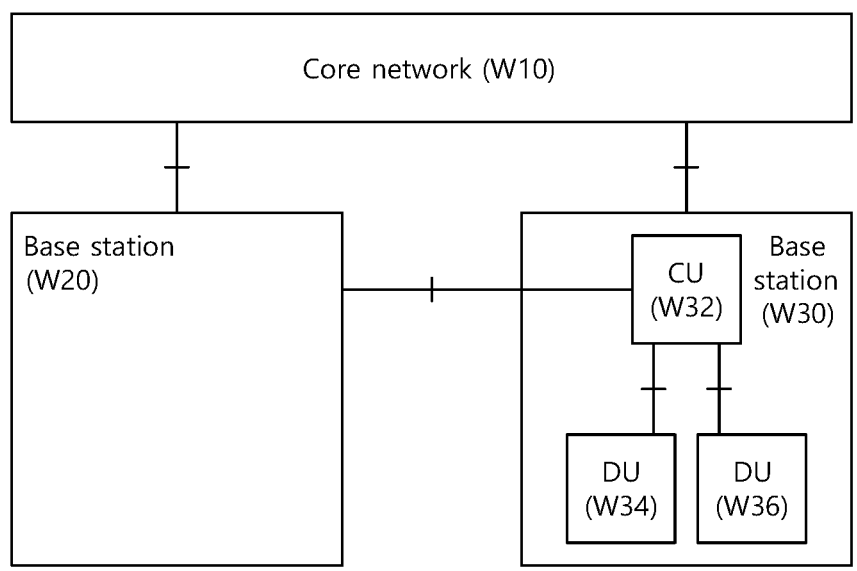
FIG. 20 illustrates a block diagram of a network node according to an embodiment.

FIG. 20 illustrates a block diagram of a network node according to an embodiment.

In particular, FIG. 20 is a diagram illustrating in detail a case in which a base station is divided into a Central Unit (CU) and a Distributed Unit (DU).

Referring to FIG. 20, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 21:
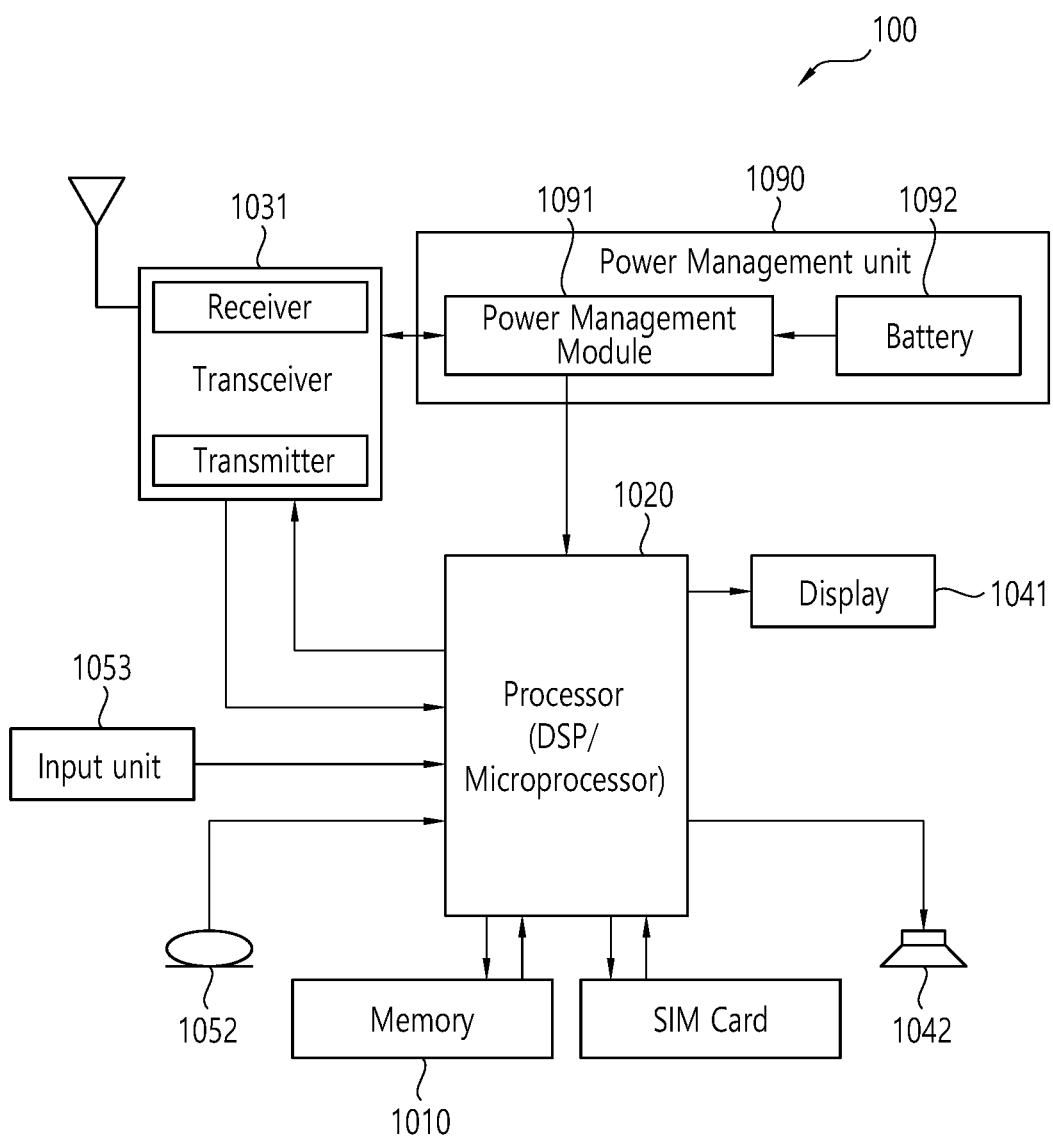
FIG. 21 is a block diagram illustrating a configuration of a UE according to an embodiment.

FIG. 21 is a block diagram illustrating a configuration of a UE according to an embodiment.

In particular, the UE 100 shown in FIG. 21 is a diagram illustrating the first device of FIG. 19 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 22:
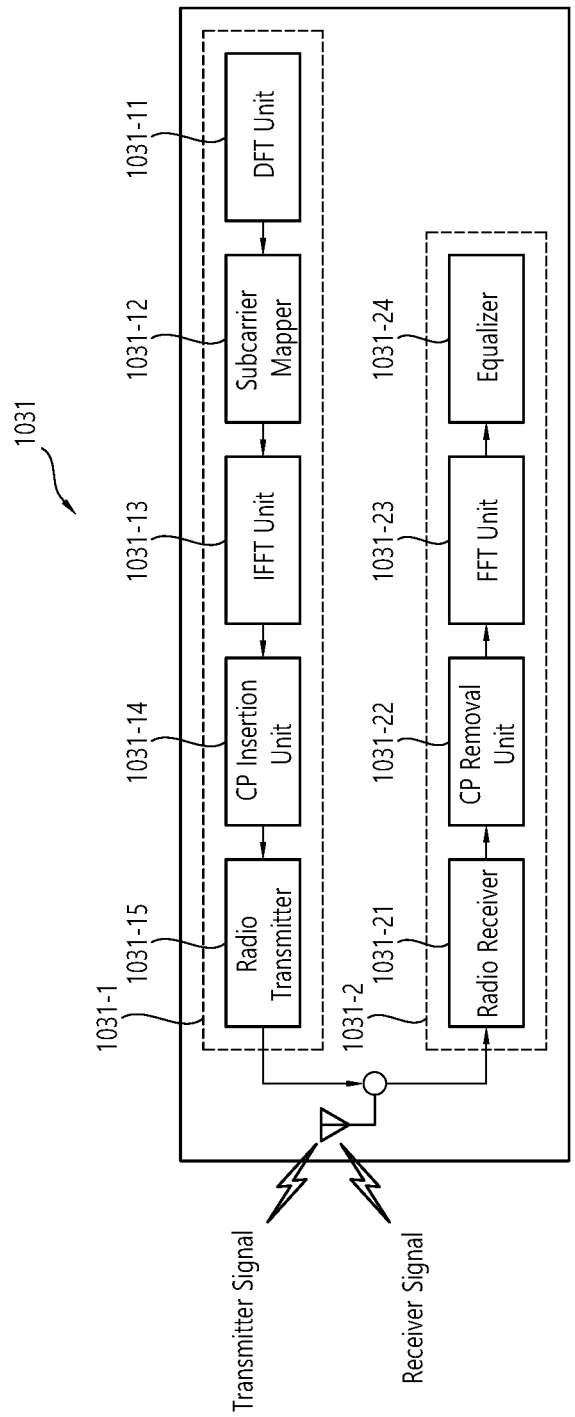
FIG. 22 is a detailed block diagram illustrating the transceiver of the first device shown in FIG. 19 or the transceiver of the device shown in FIG. 17 in detail.

FIG. 22 is a detailed block diagram illustrating the transceiver of the first device shown in FIG. 19 or the transceiver of the device shown in FIG. 17 in detail.

Referring to FIG. 22, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Scenario to Which the Disclosure of the Present Specification can be Applied

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 23:
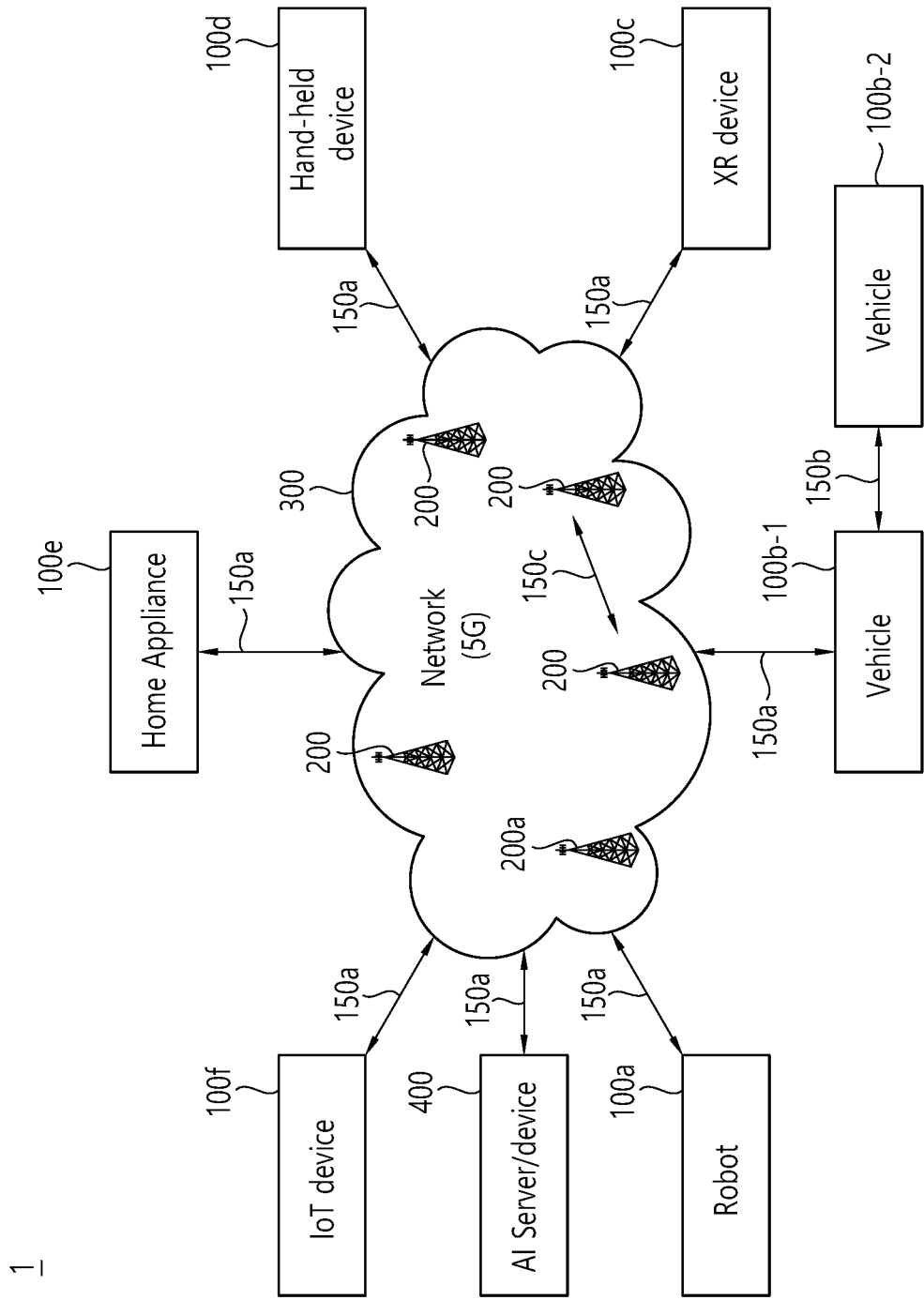
FIG. 23 illustrates a communication system 1 applied to the disclosure of the present specification.

FIG. 23 illustrates a communication system 1 applied to the disclosure of the present specification.

Referring to FIG. 23, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/25 base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method comprising:
    establishing a Protocol Data Unit (PDU) session;
    obtaining redundant transmission experience analytics from a Network Data Analytics Function (NWDAF);
    determining whether to i) perform redundant transmission or ii) stop redundant transmission which had been activated, based on the redundant transmission experience analytics; and
    based on i) the redundant transmission having been activated on the PDU session and ii) determining to stop the redundant transmission, indicating a User Plane Function (UPF) to release Core Network (CN) tunnel information which is used as redundancy tunnel of the PDU session and also indicating the UPF to stop packet duplication and elimination for a Quality of Service (QOS) flow,
    wherein the redundant transmission experience analytics is derived by the NWDAF based on a Uplink (UL)/Downlink (DL) packet drop rate.

2. The method of claim 1, wherein whether to i) perform redundant transmission or ii) stop redundant transmission is determined during a PDU session modification procedure.

3. The method of claim 1, wherein whether to i) perform redundant transmission or ii) stop redundant transmission is determined further based on authorized 5G QoS Identifiers (5QIs), NG-RAN node capabilities and/or operator configurations.

4. The method of claim 1, wherein the redundant transmission experience analytics includes one or more of:
    a Data Network Name (DNN);
    observed statistics; and
    a percentage on which a UE, any UE, or UE group efficiently use the PDU session with redundant transmission.

5. The method of claim 1, wherein, based on the redundant transmission being performed for one or more QoS flows of a PDU session to be switched to a target Next Generation Radio Access Network (NG-RAN), the method further comprises selecting two intermediate User Plane Functions (I-UPFs).

6. The method of claim 1, wherein, based on determining to perform the redundant transmission, the method further comprises indicating to a UPF to perform packet duplication and elimination for QoS flows.

7. A Session Management Function (SMF) comprising:
    at least one transceiver;
    at least one processor; and
    at least one memory for storing instructions and operably electrically connectable to the at least one processor, wherein the instructions, based on being executed by the at least one processor, perform operations comprising:
    establishing a Protocol Data Unit (PDU) session;
    obtaining redundant transmission experience analytics from a Network Data Analytics Function (NWDAF);
    determining whether to i) perform redundant transmission or ii) stop redundant transmission which had been activated, based on the redundant transmission experience analytics; and
    based on i) the redundant transmission having been activated on the PDU session and ii) determining to stop the redundant transmission, indicating a User Plane Function (UPF) to release Core Network (CN) tunnel information which is used as redundancy tunnel of the PDU session and also indicating the UPF to stop packet duplication and elimination for a Quality of Service (QOS) flow,
    wherein the redundant transmission experience analytics is derived by the NWDAF based on a Uplink (UL)/Downlink (DL) packet drop rate.

8. The SMF of claim 7, wherein whether to i) perform redundant transmission or ii) stop redundant transmission is determined during a PDU session modification procedure.

9. The SMF of claim 7, wherein whether to i) perform redundant transmission or ii) stop redundant transmission is determined further based on authorized 5G QOS Identifiers (5QIs), NG-RAN node capabilities and/or operator configurations.

10. The SMF of claim 7, wherein the redundant transmission experience analytics includes one or more of:
    a Data Network Name (DNN);
    observed statistics; and
    a percentage on which a UE, any UE, or UE group efficiently use the PDU session with redundant transmission.

11. The SMF of claim 7, wherein, based on determining to perform the redundant transmission, the operations further comprise indicating to a UPF to perform packet duplication and elimination for QoS flows.

12. A User Equipment (UE) comprising:
    at least one transceiver;
    at least one processor; and
    at least one memory for storing instructions and operably electrically connectable to the at least one processor, wherein the instructions, based on being executed by the at least one processor, perform operations comprising:
    establishing a Protocol Data Unit (PDU) session;
    transmitting a Non-Access Stratum (NAS) message,
    wherein the NAS message includes a PDU session modification request and an identifier (ID) of the PDU session,
    wherein the NAS message is forwarded by a Radio Access Network (RAN) to an Access and mobility Management Function (AMF),
    wherein the PDU session modification request is forwarded by the AMF to a Session Management Function (SMF), wherein it is determined to perform redundant transmission for the PDU session based on redundant transmission experience analytics; and
receiving, from the RAN, an Access Network (AN) specific signaling from the RAN which is related to information received from the SMF,
wherein the AN specific signaling includes an N1 Session Management (SM) container including a PDU session modification command.

* * * * *